(12) United States Patent
Aybay

(10) Patent No.: US 10,554,528 B2
(45) Date of Patent: *Feb. 4, 2020

(54) METHODS AND APPARATUS FOR TRACKING DATA FLOW BASED ON FLOW STATE VALUES

(71) Applicant: Juniper Networks, Inc., Sunnyvale, CA (US)

(72) Inventor: Gunes Aybay, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/933,846

(22) Filed: Mar. 23, 2018

(65) Prior Publication Data

US 2018/0212851 A1 Jul. 26, 2018

Related U.S. Application Data

(63) Continuation of application No. 15/043,037, filed on Feb. 12, 2016, now Pat. No. 9,967,167, which is a
(Continued)

(51) Int. Cl.
*H04L 12/26* (2006.01)
*H04L 29/06* (2006.01)
*H04L 12/801* (2013.01)

(52) U.S. Cl.
CPC ........ *H04L 43/0894* (2013.01); *H04L 43/026* (2013.01); *H04L 43/04* (2013.01);
(Continued)

(58) Field of Classification Search
CPC ... H04L 43/0894; H04L 43/026; H04L 43/04; H04L 43/18; H04L 47/10; H04L 63/1408;
(Continued)

(56) References Cited

U.S. PATENT DOCUMENTS 5,359,593 A 10/1994 Derby
5,457,687 A 10/1995 Newman
(Continued)

FOREIGN PATENT DOCUMENTS

EP 1133110 A2 9/2001
EP 1892905 A1 2/2008
(Continued)

OTHER PUBLICATIONS

Search Report for European Application No. 09170041.9, dated Nov. 23, 2009 (8 pages).
(Continued)

*Primary Examiner* — Blake J Rubin
(74) *Attorney, Agent, or Firm* — Cooley LLP

(57) ABSTRACT

In one embodiment, a processor-readable medium storing code representing instructions that when executed by a processor cause the processor to update, at a memory location, a first flow state value associated with a data flow to a second flow state value when at least one of a packet from the data flow is received or the memory location is selected after a time period has expired. At least a portion of the packet is analyzed when the second flow state value represents a flow rate of a network data flow anomaly.

16 Claims, 6 Drawing Sheets

Related U.S. Application Data continuation of application No. 12/646,114, filed on Dec. 23, 2009, now Pat. No. 9,264,321.

(52) U.S. Cl.
CPC ............. *H04L 43/18* (2013.01); *H04L 47/10* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/1458* (2013.01); *H04L 63/1466* (2013.01)

(58) Field of Classification Search
CPC ............. H04L 63/1416; H04L 63/1425; H04L 63/1433; H04L 63/1441; H04L 63/1458; H04L 63/1466
See application file for complete search history.

(56) References Cited

U.S. PATENT DOCUMENTS

| | | |
|---|---|---|
| 5,926,462 A | 7/1999 | Schenkel |
| 5,926,473 A | 7/1999 | Gridley |
| 5,987,008 A | 11/1999 | Simpson et al. |
| 5,987,028 A | 11/1999 | Yang et al. |
| 5,991,295 A | 11/1999 | Tout et al. |
| 6,049,546 A | 4/2000 | Ramakrishnan |
| 6,073,089 A | 6/2000 | Baker et al. |
| 6,324,165 B1 | 11/2001 | Fan et al. |
| 6,370,145 B1 | 4/2002 | Dally et al. |
| 6,438,107 B1 | 8/2002 | Somiya et al. |
| 6,512,747 B1 | 1/2003 | Umeuchi et al. |
| 6,597,660 B1 | 7/2003 | Rueda et al. |
| 6,618,357 B1 | 9/2003 | Geyer et al. |
| 6,657,962 B1 | 12/2003 | Barri et al. |
| 6,757,249 B1 | 6/2004 | Kejriwal et al. |
| 6,816,456 B1 | 11/2004 | Tse-Au |
| 6,856,622 B1 | 2/2005 | Calamvokis et al. |
| 6,944,173 B1 | 9/2005 | Jones et al. |
| 6,973,032 B1 | 12/2005 | Casley et al. |
| 6,977,932 B1 | 12/2005 | Hauck |
| 6,986,161 B2 | 1/2006 | Billhartz |
| 7,027,457 B1 | 4/2006 | Chiussi et al. |
| 7,046,631 B1 | 5/2006 | Giroux et al. |
| 7,061,862 B2 | 6/2006 | Horiguchi et al. |
| 7,075,934 B2 | 7/2006 | Chiussi et al. |
| 7,085,846 B2 | 8/2006 | Jenne et al. |
| 7,173,931 B2 | 2/2007 | Chao et al. |
| 7,185,368 B2 | 2/2007 | Copeland, III |
| 7,230,947 B1 | 6/2007 | Huber et al. |
| 7,233,568 B2 | 6/2007 | Goodman et al. |
| 7,234,168 B2 | 6/2007 | Gupta et al. |
| 7,269,666 B1 | 9/2007 | Leitner et al. |
| 7,277,429 B2 | 10/2007 | Norman et al. |
| 7,283,471 B2 | 10/2007 | Gutierrez et al. |
| 7,290,283 B2 | 10/2007 | Copeland, III |
| 7,324,442 B1 | 1/2008 | Pan et al. |
| 7,327,680 B1 | 2/2008 | Kloth |
| 7,385,924 B1 | 6/2008 | Riddle |
| 7,391,736 B2 | 6/2008 | Na et al. |
| 7,403,524 B2 | 7/2008 | Hill |
| 7,424,744 B1 | 9/2008 | Wu et al. |
| 7,430,175 B2 | 9/2008 | Dropps et al. |
| 7,440,448 B1 | 10/2008 | Lu et al. |
| 7,457,245 B2 | 11/2008 | McAlpine et al. |
| 7,519,860 B2 | 4/2009 | Hatonen et al. |
| 7,540,025 B2 | 5/2009 | Tzadikario |
| 7,543,052 B1 | 6/2009 | Cesa Klein |
| 7,600,007 B1 | 10/2009 | Lewis |
| 7,643,418 B1 | 1/2010 | Varier et al. |
| 7,701,849 B1 | 4/2010 | Ma |
| 7,719,982 B2 | 5/2010 | Varma |
| 8,125,898 B1 | 2/2012 | Strayer et al. |
| 8,254,255 B2 | 8/2012 | Thomas |
| 8,553,710 B1 | 10/2013 | White et al. |
| 8,724,628 B1 | 5/2014 | Aybay |
| 8,811,163 B2 | 8/2014 | Godbole et al. |
| 9,065,773 B2 | 6/2015 | Aybay |
| 9,264,321 B2 | 2/2016 | Aybay |
| 9,602,439 B2 | 3/2017 | Aybay et al. |
| 9,660,940 B2 | 5/2017 | Anand et al. |
| 2001/0021176 A1 | 9/2001 | Mimura et al. |
| 2002/0057699 A1 | 5/2002 | Roberts |
| 2002/0064170 A1 | 5/2002 | Siu et al. |
| 2002/0075883 A1 | 6/2002 | Dell et al. |
| 2002/0080789 A1 | 6/2002 | Henderson et al. |
| 2002/0089937 A1 | 7/2002 | Venkatachary et al. |
| 2002/0118692 A1 | 8/2002 | Oberman et al. |
| 2002/0154637 A1 | 10/2002 | Keller-Tuberg |
| 2002/0167950 A1 | 11/2002 | Chang et al. |
| 2003/0005145 A1 | 1/2003 | Bullard |
| 2003/0020764 A1 | 1/2003 | Germain et al. |
| 2003/0023733 A1 | 1/2003 | Lingafelt et al. |
| 2003/0026287 A1 | 2/2003 | Mullendore et al. |
| 2003/0035432 A1 | 2/2003 | Sreejith et al. |
| 2003/0058880 A1 | 3/2003 | Sarkinen et al. |
| 2003/0063348 A1 | 4/2003 | Posey |
| 2003/0218977 A1 | 11/2003 | Pan et al. |
| 2004/0001433 A1 | 1/2004 | Gram et al. |
| 2004/0013124 A1 | 1/2004 | Peebles et al. |
| 2004/0165598 A1 | 8/2004 | Shrimali et al. |
| 2004/0214770 A1 | 10/2004 | Reich et al. |
| 2004/0215770 A1 | 10/2004 | Maher et al. |
| 2005/0013300 A1 | 1/2005 | Akahane et al. |
| 2005/0036502 A1 | 2/2005 | Blanc et al. |
| 2005/0039086 A1 | 2/2005 | Krishnamurthy et al. |
| 2005/0052992 A1 | 3/2005 | Cloonan et al. |
| 2005/0108444 A1 | 5/2005 | Flauaus et al. |
| 2005/0111460 A1 | 5/2005 | Sahita |
| 2005/0138238 A1 | 6/2005 | Tierney et al. |
| 2005/0138243 A1 | 6/2005 | Tierney et al. |
| 2005/0210533 A1 | 9/2005 | Copeland et al. |
| 2005/0226156 A1 | 10/2005 | Keating et al. |
| 2005/0234920 A1 | 10/2005 | Rhodes |
| 2005/0249214 A1 | 11/2005 | Peng |
| 2005/0276263 A1 | 12/2005 | Suetsugu et al. |
| 2006/0026682 A1 | 2/2006 | Zakas |
| 2006/0075093 A1 | 4/2006 | Frattura et al. |
| 2006/0104298 A1 | 5/2006 | McAlpine et al. |
| 2006/0120289 A1 | 6/2006 | Cunningham |
| 2006/0123480 A1 | 6/2006 | Oh et al. |
| 2006/0146703 A1 | 7/2006 | Cha et al. |
| 2006/0272018 A1 | 11/2006 | Fouant |
| 2006/0285548 A1 | 12/2006 | Hill et al. |
| 2007/0011734 A1 | 1/2007 | Balakrishnan et al. |
| 2007/0064617 A1 | 3/2007 | Reves |
| 2007/0067438 A1 | 3/2007 | Goranson et al. |
| 2007/0076606 A1 | 4/2007 | Olesinski et al. |
| 2007/0086464 A1 | 4/2007 | Somashekhar |
| 2007/0094729 A1 | 4/2007 | Hoefelmeyer et al. |
| 2007/0112955 A1 | 5/2007 | Clemm et al. |
| 2007/0118909 A1 | 5/2007 | Hertzog et al. |
| 2007/0150949 A1 | 6/2007 | Futamura et al. |
| 2007/0180526 A1 | 8/2007 | Copeland, III |
| 2007/0192861 A1 | 8/2007 | Varghese et al. |
| 2007/0192862 A1 | 8/2007 | Vermeulen et al. |
| 2007/0237079 A1 | 10/2007 | Whitehead |
| 2007/0240207 A1 | 10/2007 | Belakhdar et al. |
| 2007/0250930 A1 | 10/2007 | Aziz et al. |
| 2007/0268830 A1 | 11/2007 | Li et al. |
| 2008/0028467 A1 | 1/2008 | Kommareddy et al. |
| 2008/0080548 A1 | 4/2008 | Mullendore et al. |
| 2008/0082977 A1 | 4/2008 | Araujo et al. |
| 2008/0123545 A1 | 5/2008 | Watanabe et al. |
| 2008/0133517 A1 | 6/2008 | Kapoor et al. |
| 2008/0137671 A1* | 6/2008 | Agarwal ................. H04L 65/80 370/401 |
| 2008/0151863 A1 | 6/2008 | Lawrence et al. |
| 2008/0167920 A1 | 7/2008 | Schmidt et al. |
| 2008/0198746 A1 | 8/2008 | Kwan et al. |
| 2008/0253289 A1 | 10/2008 | Naven et al. |
| 2008/0259798 A1 | 10/2008 | Loh et al. |
| 2008/0263661 A1 | 10/2008 | Bouzida |
| 2008/0285449 A1 | 11/2008 | Larsson et al. |

(56) References Cited

U.S. PATENT DOCUMENTS

| | | | |
|---|---|---|---|
| 2009/0003212 | A1 | 1/2009 | Kwan et al. |
| 2009/0077663 | A1 | 3/2009 | Sun et al. |
| 2009/0086651 | A1 | 4/2009 | Luft et al. |
| 2009/0204964 | A1 | 8/2009 | Foley et al. |
| 2009/0252041 | A1 | 10/2009 | Dolganow et al. |
| 2009/0300209 | A1 | 12/2009 | Elzur |
| 2010/0061238 | A1 | 3/2010 | Godbole et al. |
| 2010/0061239 | A1 | 3/2010 | Godbole et al. |
| 2010/0061390 | A1 | 3/2010 | Godbole et al. |
| 2010/0085891 | A1 | 4/2010 | Kind et al. |
| 2010/0118885 | A1* | 5/2010 | Congdon ............... H04L 49/254 370/419 |
| 2010/0158031 | A1 | 6/2010 | Thomas et al. |
| 2010/0188986 | A1 | 7/2010 | Csaszar et al. |
| 2011/0296002 | A1 | 12/2011 | Caram |
| 2012/0140626 | A1 | 6/2012 | Anand et al. |
| 2014/0064080 | A1* | 3/2014 | Stevens ............... H04L 47/2441 370/235 |

FOREIGN PATENT DOCUMENTS

| | | |
|---|---|---|
| GB | 2361139 A | 10/2001 |
| WO | WO 1997/004546 | 2/1997 |

OTHER PUBLICATIONS

Partial Search Report for European Application No. 11188568.7, dated Feb. 22, 2012 (5 pages).
Examination Report for European Application No. 09170041.9, dated Mar. 13, 2012 (7 pages).
Office Action dated Mar. 26, 2010 for U.S. Appl. No. 12/242,224 (17 pages).
Office Action dated Sep. 17, 2010 for U.S. Appl. No. 12/242,224 (9 pages).
Office Action dated Aug. 9, 2011 for U.S. Appl. No. 12/242,224 (7 pages).
Office Action dated Mar. 29, 2010 for U.S. Appl. No. 12/242,230 (11 pages).
Office Action dated Sep. 17, 2010 for U.S. Appl. No. 12/242,230 (16 pages).
Office Action dated Mar. 17, 2011 for U.S. Appl. No. 12/242,230 (11 pages).
Office Action dated Oct. 6, 2011 for U.S. Appl. No. 12/242,230 (19 pages).
Office Action dated Apr. 29, 2010 for U.S. Appl. No. 12/343,728 (21 pages).
Office Action dated Oct. 15, 2010 for U.S. Appl. No. 12/343,728 (22 pages).
Office Action dated May 2, 2011 for U.S. Appl. No. 12/343,728 (22 pages).
Final Office Action dated Oct. 7, 2011 for U.S. Appl. No. 12/343,728 (25 pages).
Office Action dated May 11, 2010 for U.S. Appl. No. 12/345,490 (12 pages).
Office Action dated Oct. 15, 2010 for U.S. Appl. No. 12/345,490 (14 pages).
Office Action dated Apr. 1, 2011 for U.S. Appl. No. 12/345,490 (14 pages).
Office Action dated Aug. 19, 2011 for U.S. Appl. No. 12/345,490 (14 pages).
Non-Final Office Action for U.S. Appl. No. 12/771,413, dated May 24, 2012.
Office Action dated May 23, 2011 for U.S. Appl. No. 12/558,118 (6 pages).
U.S. Appl. No. 12/345,490, filed Dec. 29, 2008, entitled "Flow-Control in a Switch Fabric" (38 pages).
U.S. Appl. No. 12/771,413, filed Apr. 30, 2010, entitled "Methods and Apparatus for Flow Control Associated with a Switch Fabric" (44 pages).
U.S. Appl. No. 12/820,797, filed Jun. 22, 2010, entitled "Methods and Apparatus Virtual-Channel Flow Control Associated with a Switch Fabric" (54 pages).
U.S. Appl. No. 13/441,083, filed Apr. 6, 2012, entitled "Methods and Apparatus for Flow Control Associated With Multi-Staged Queues".
U.S. Appl. No. 12/859,015, filed Aug. 18, 2010, entitled "Fibre Channel Credit-Based Link Flow Control Overlay Onto Fibre Channel Over Ethernet" (41 pages).
U.S. Appl. No. 12/953,149, filed Nov. 23, 2010, entitled "Methods and Apparatus for Destination Based Hybrid Load Balancing Within a Switch Fabric" (49 pages).
U.S. Appl. No. 12/957,472, filed Dec. 1, 2010, entitled "Methods and Apparatus for Flow Control Associated With a Switch Fabric" (46 pages).
Alizadeh, M. et al., "Data Center TCP (DCTCP)" SIGCOMM'10, Aug. 30-Sep. 3, 2010, New Delhi, India, Copyright 2010 ACM 978-1-4503-0201-Feb. 10, 2008 (12 pages).
Dally, W. J., "Virtual-Channel Flow Control," IEEE Transactions on Parallel and Distributed Systems, vol. 3, No. 2, Mar. 1992, pp. 194-205.
Liotopoulos, F. K. et al., "A Modular, 160 Gbps ATM Switch Architecture for Multimedia Networking Support, based on a 3-Stage Clos Network," Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.
Minkenberg, C. et al. "Adaptive Routing for Convergence Enhanced Ethernet," In Proc Int Conf on High Performance Switching and Routing (HPSR), pp. 1-8, Jun. 22-24, 2009.

\* cited by examiner

METHODS AND APPARATUS FOR TRACKING DATA FLOW BASED ON FLOW STATE VALUES

CROSS-REFERENCE TO RELATED APPLICATION

This application is a Continuation of U.S. patent application Ser. No. 15/043,037, (now U.S. Pat. No. 9,967,167), filed Feb. 12, 2016, and entitled "METHODS AND APPARATUS FOR TRACKING DATA FLOW BASED ON FLOW STATE VALUES", which is a Continuation of, and claims priority to and the benefit of, U.S. patent application Ser. No. 12/646,114, (now U.S. Pat. No. 9,264,321), filed Dec. 23, 2009 and entitled, "METHODS AND APPARATUS FOR TRACKING DATA FLOW BASED ON FLOW STATE VALUES." The entire contents of the aforementioned applications are herein expressly incorporated by reference.

BACKGROUND

Embodiments described herein relate generally to detecting network anomalies related to data flows, such as, for example, methods and apparatus for tracking data flow based on flow state values.

Known network traffic analyzers can be configured to detect undesirable network data flow anomalies (e.g., a denial of service of attack, a series of network routing errors) as packets are being processed (e.g., switched) within a network. These known network traffic analyzers, however, are unable to detect "zero-day" attacks in a desirable fashion because these network traffic analyzers often rely on previously-observed signatures to detect future data flow anomalies. Thus, a data flow anomaly that has a new signature may not be immediately detected. In addition, known network traffic analyzers configured to perform packet inspection based on previously-observed signatures for data flow anomaly detection at high data rates (e.g., terabits per second) can be prohibitively expensive from a power consumption, processing, and/or cost perspective. Thus, a need exists for methods and apparatus for tracking data flow that can address, for example, one or more of the shortfalls of existing network traffic analyzers.

SUMMARY

In one embodiment, a processor-readable medium storing code representing instructions that when executed by a processor cause the processor to update, at a memory location, a first flow state value associated with a data flow to a second flow state value when at least one of a packet from the data flow is received or the memory location is selected after a time period has expired. At least a portion of the packet is analyzed when the second flow state value represents a flow rate of a network data flow anomaly.

DETAILED DESCRIPTION

Figure 1:
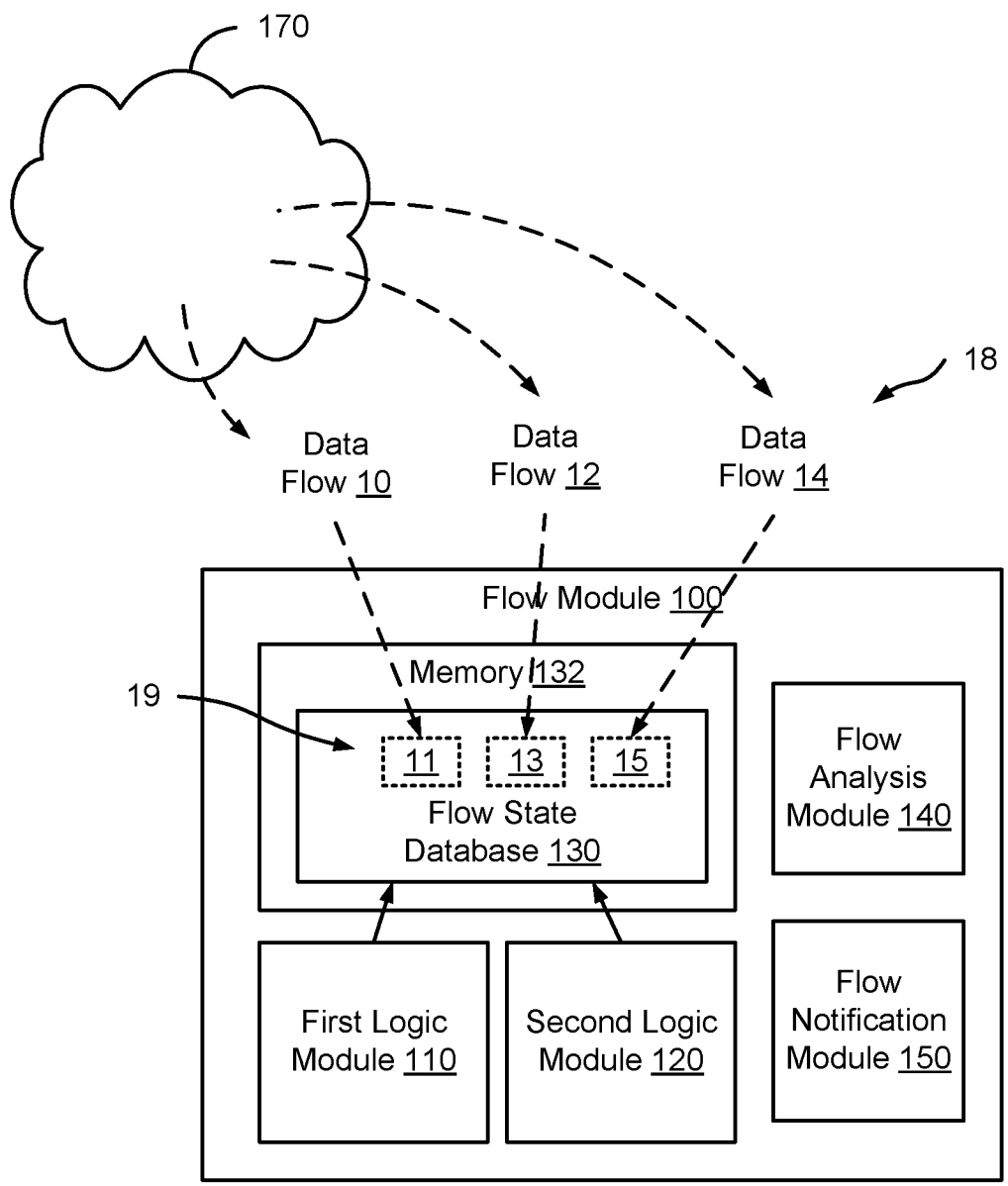
FIG. 1 is a schematic diagram that illustrates a flow module configured to process flow state values associated with data flows, according to an embodiment.

In one embodiment, a flow state value associated with a data flow (e.g., a stream of packets of a particular type) can be modified by more than one independently-operating logic module so that a data flow can be identified as an undesirable data flow (e.g., a data flow anomaly) or as a desirable data flow (e.g., an authorized data flow). The independently-operating logic modules can be included in a flow module. For example, a flow state value associated with a data flow can be modified by a first logic module (e.g., a flow state advancement module) of a flow module based on a first algorithm (or set of conditions), and the flow state value associated with the data flow can be modified by a second logic module (e.g., a flow state timing module) of the flow module based on a second algorithm (or set of conditions). Although the first logic module can be configured to operate substantially independent from the second logic module, the first logic module and the second logic module can be collectively configured so that a characteristic of the data flow can be identified and/or an action can be triggered when a state condition is satisfied based on the flow state value. For example, a state condition can be satisfied when the flow state value matches a threshold flow state value (which can be included in the state condition) after being changed by (e.g., defined by) the first logic module and/or the second logic module.

In some embodiments, the first logic module can be configured to change the flow state value in a first direction within a series of flow state values (e.g., change the flow state value from a first flow state value to a second flow state value) towards the threshold state value based on a first algorithm while the second logic module can be configured to change the flow state value in a second direction within the series of flow state values (e.g., change the flow state value from the second flow state value to the first flow state value) based on a second algorithm. In some embodiments, the first algorithm and the second algorithm can be mutually exclusive or can have overlapping portions. In some embodiments, processing at a flow module can be based on, for example, other types of data segments such as cells rather than packets.

In some embodiments, a data flow can be defined by one or more packets configured to request a connection and/or one or more packets associated with the connection after the connection has been established. In some embodiments, information about each new data flow (e.g., new connection request) can be forwarded to a flow analysis module. For example, a portion of a packet (e.g., an L2, L3, and/or L4 header of the packet) from the new data flow can be forwarded to the flow analysis module. A data flow can be identified as a new data flow when a flow state value associated with one or more packets of the data flow is a specified flow state value (e.g., a "01" flow state value) or is transitioned to a specified flow state value. In some embodiments, a data flow can be identified as being associated with an established connection when a flow state value associated with one or more packets of the data flow is a specified flow state value (e.g., a "11" flow state value) or is transitioned to a specified flow state value, different from the specified flow state value associated with a new connection.

In some embodiments, a flow module can be configured to determine, based on a flow state value associated with a data flow, whether or not the data flow is associated with (or potentially associated with), for example, an undesirable network anomaly such as a denial of service of attack (e.g., a distributed denial of service attack), or a series of network routing errors. Such an undesirable network anomaly can be identified without deep packet inspection. Subsequent to an undesirable network anomaly being identified, deep packet inspection, pattern matching and/or regular expression evaluation of the data flow (and/or one or more packets associated with the data flow) can be triggered based on the flow state value analysis. For example, a first logic module and a second logic module can be configured to collectively define flow state values that represent data flows being received at a flow module. Specifically, the first logic module can be configured to increment multiple flow state values stored within a memory based on a first algorithm (or set of conditions), and the second logic module can be configured to decrement (independent of flow state value processing performed by (e.g., executed by) the first logic module) multiple flow state values stored within the memory based on a second algorithm (or set of conditions). The first algorithm and the second algorithm can be defined so that the flow state value, when collectively defined by the interplay of the first logic module and the second logic module, will represent, for example, a state of data flows and/or a number of packets of the data flows. In some embodiments, a flow state value associated with a data flow can represent an approximate count of the number of data packets that have been transmitted in connection with the data flow, rather than an absolute count of the number of data packets associated with the data flow. In some embodiments, the flow state value can represent a precise count of the number of data packets that have been transmitted in connection with the data flow, rather than an absolute count of the number of data packets associated with the data flow.

In some embodiments, the flow state values associated with multiple data flows (e.g., several data flows, hundreds of data flows, thousands of data flows) can be tracked in a memory based on hashing of packets associated with the data flows. In some embodiments, the second logic module used to decrement a flow state value can be a timer module. In some embodiments, multiple timer modules can be used to decrement flow state values stored in a memory, and one or more of the timer modules can be triggered to decrement a flow state value based on the value of the flow state value. In some embodiments, the collective analysis of data packets associated with data flows all having a particular flow state value (or set of flow state values) can be performed to determine whether the data flows are associated with an undesirable network anomaly such as, for example, a high number of connection request packets associated with a distributed denial of service of attack. In some embodiments, the data packets associated with the denial of service attack can have a similar packet signature (e.g., a similar header and origin identifier).

FIG. 1 is a schematic diagram that illustrates a flow module 100 configured to process flow state values 19 associated with data flows 18, according to an embodiment. Specifically, the flow module 100 is configured to process flow state value 11, flow state value 13, and flow state value 15, which are respectively associated with data flow 10, data flow 12, and data flow 14 (as represented by the dashed arrows shown in FIG. 1).

Each of the data flows 18 can be defined by, for example, a group of packets such as Ethernet packets, session control protocol packets, and/or other types of data packets. In some embodiments, the packets can have a header, a payload, and a trailer that is defined based on, for example, an internet protocol (IP) protocol associated with any layer of the open systems interconnection (OSI) model. In some embodiments, the data flows 18 can be referred to as data streams, or as packet streams. In some embodiments, one or more of the data flows 18 can be associated with a communication session. For example, data flow 10 can define at least a portion of a first communication session, and data flow 12 can define at least a portion of a second communication session different from the first communication session.

In some embodiments, one or more portions of the data flows 18 can be received in parallel or in serial. For example, a first packet from the data flow 12 can be received at the flow module 100 via a network interface card (not shown) of the flow module 100 and a second packet from data flow 14 can later be received (in serial) at the flow module 100 via the network interface card. In some embodiments, a first packet from the data flow 12 can be received at the flow module 100 via a first network interface card (not shown) of the flow module 100 during a time period, and a second packet from data flow 14 can be received during the same time period (in parallel) at the flow module 100 via a second network interface card.

The flow state values 19 can be used to identify one or more characteristics of the data flows 18. For example, flow state value 11 can be used to represent a number (e.g., an approximate number) of packets of data flow 10 that have been received at flow module 100 over a specified period of time. In some embodiments, one or more of the flow state values 19 can represent a count of packets included in one or more of the data flows 18. In some embodiments, one or more of the flow state values 19 can represent an ordering of packet types that define one or more of the data flows 18.

One or more of the flow state values 19 can be defined by (e.g., modified by) a first logic module 110 and/or a second logic module 120. For example, the first logic module 110 can be configured to change (e.g., replace, delete, increment, decrement) flow state value 13 in response to a packet being received at the flow module 100 and associated with data flow 12. In some embodiments, the flow state value 13 can be changed by (e.g., defined by) the first logic module 110 based on an algorithm. In some embodiments, the flow state value 13 can be changed by the second logic module 120 based on a different algorithm than that used by the first logic module 110. In such instances, the operation of the second logical module 120 can be independent from the operation of the first logic module 110. In some embodiments, the first logic module 110 can be, for example, a flow state advancement module and the second logic module 120 can be, for example, a flow state timing module. More details related to a flow state advancement module and a flow state timing module are described in connection with FIG. 2A and FIG. 2B.

In some embodiments, the first logic module 110 and/or the second logic module 120 can be configured to change one or more of the flow state values 19 based on a series of flow state values. Accordingly, each flow state value 19 can be from a series of flow state values. For example, flow state value 13 can correspond with a flow state value from a series of flow state values. In some embodiments, the series of flow state values can be a predefined set of flow state values. For example, the series of flow state values can be defined by a set of binary numbers (e.g., a set of sequential binary numbers).

For example, the first logic module 110 (and/or the second logic module 120) can be configured to change the flow state value 13 from a first flow state value within a series of flow state values to a second flow state value from the series of flow state values. In some embodiments, the first logic module 110 (and/or the second logic module 120) can be configured to change one or more of the flow state values 19 based on an order related to flow state values that define the series of flow state values. In some embodiments, the first logic module 110 can be configured to change one or more flow state values 19 based on an order of flow state values from a series of flow state values that is different than an order of flow state values from the series of flow state values that is used by the second logic module 120 to change the flow state value(s) 19. In some embodiments, the order of each flow state value from the series of flow state values can be determined based on a procedure (e.g., an algorithm). In such instances, flow state values can be modified by the flow module 100 based on an order that is different than a predefined order associated with a series of flow state values. More details related to a series of flow state values are described in connection with at least FIG. 2B.

In some embodiments, packets that define each data flow 18 can be identified by the flow module 100 as being associated with a respective data flow 18 based on a signature. For example, each of the packets that define data flow 12 can include a common signature that is different than a common signature of each of the packets that define data flow 14. Accordingly, a packet can be identified as a packet associated with data flow 12 rather than other data flows based on a signature of the packet that is the same as the signatures of other packets included in the data flow 12. In some embodiments, the signatures can be referred to as flow signatures. In some embodiments, the signature can be defined by (or based on) bit values of at least a portion (e.g., a header portion) of a packet. In some embodiments, one or more of the data flows 18 can have a signature associated with a source device of the data flow(s) 18 and/or a destination device of the data flow(s) 18. In some embodiments, a signature can be based on a portion of header (e.g., a layer-2 (L2) portion of a header, a layer-3 (L3) portion of a header, a layer-4 (L4) portion of a header).

In some embodiments, one or more of the flow state values 19 can be defined (or changed) by the first logic module 110 and/or the second logic module 120 based on a signature of a packet (which can be associated with at least one of the data flows 18) that is received at the flow module 100. For example, the first logic module 110 can be configured to modify the flow state value 15 based on a signature of a packet (not shown) received at the flow module 100. In some embodiments, the flow state value 15 can be modified in response to the packet being associated with data flow 14 based on the signature.

In some embodiments, one or more of the flow state values 19 can be configured to trigger an action (e.g., an analysis, sending of a notification) when a state condition is satisfied, or unsatisfied, based on the flow state value(s) 19. For example, a packet from data flow 14 can be analyzed at flow analysis module 140 of the flow module 100 in response to a state condition being satisfied based on flow state value 15. In some embodiments, deep packet inspection, pattern matching and/or regular expression evaluation of the packet (or a data flow associated with the packet) can be performed at the flow analysis module 140. The flow state value 15 can satisfy the state condition after being changed (based on one or more algorithms) by the first logic module 110 and/or the second logic module 120. In some embodiments, the state condition can be satisfied when the flow state value 15 matches a threshold flow state value as defined within the state condition. In some embodiments, a notification (e.g., a notice, an e-mail message, an indicator) can be sent (e.g., sent to a network administrator) by the flow notification module 150 in response to a state condition being satisfied based on one or more of the flow state value(s) 19. If the state condition is defined so that an undesirable network anomaly such as a denial of service attack can be identified, a notice that the network anomaly may have been detected can be sent to, for example, a network administrator by the flow notification module 150.

As shown in FIG. 1, the flow state values 19 are stored in a flow state database 130 within a memory 132 of the flow module 100. The flow state values 19 can define at least a portion of the flow state database 130. In some embodiments, the memory 132 can be, for example, a random-access memory (RAM) (e.g., a dynamic RAM, and static RAM), a flash memory, a removable memory, and/or so forth. In some embodiments, the flow state database 130 can be implemented as, for example, a relational database, a table, and/or so forth. In some embodiments, the flow state values 19 can each be stored in a location within the memory 132 based on, for example, a hash of a portion a packet associated with each of the data flows 18. For example, the flow state value 13 can be stored in a location within the memory 132 based on a hash of an L2 portion of a header of a packet from data flow 12.

As shown in FIG. 1, the data flows 18 can be from a network 170 (or a portion of a network). In some embodiments, the network 170 can be, for example, a wireless network and/or a wired network. In some embodiments, the network 170 can be, for example, associated with a data center. In such instances, the network 170 can be referred to as a data center network. In some embodiments, the flow module 100 can be disposed outside of the network 170, can be included within the network 170, or can be at an edge (e.g., within an edge device) of the network 170.

In some embodiments, statistics related to the flow state values 19 of the data flows 18 can be collected and used by the flow analysis module 140 to determine whether or not one or more of the data flows 18 is associated with a flow anomaly. For example, if one or more of the data flows 18 has a flow state value of "01" these data flow(s) 18 can be identified as potentially being failed connection (e.g., session) attempts associated with a flow anomaly. The connection attempts can be denied when the connection attempts are from an unrecognized source or unauthorized source. One or more of the data flows 18 can be identified as being associated with a successful connection (e.g., an authorized connection) not associated with a flow anomaly when the data flow(s) 18 have a flow state value of, for example, "11." In some embodiments, the flow analysis module 140 can be configured to determine that a flow anomaly may exist if a certain percentage (or specified number) of the flow state values (such as flow state values 19) included in the flow state database 130 at a given time (or during a specified time period) are a particular flow state value (e.g., a threshold flow state value, a flow state value of "01"). In some embodiments, the flow state database 130 can be configured to store flow state values (such as flow state values 19) associated with more than one flow module (such as flow module 100).

In some embodiments, the flow module 100 can be any type of entity (or included in any entity) configured to receive and process data. Although not shown, in some embodiments, the flow module 100 can be associated with (e.g., included in), for example, one or more portions of a distributed switch/router based around a multi-stage switch fabric (e.g., 3-stage switch fabric, 5-stage switch fabric). For example, although not shown, the switch fabric can include an ingress stage, a middle stage, and an egress stage. In some embodiments, the switch fabric can be a reconfigurably (e.g., a re-arrangeably) non-blocking switch fabric and/or a time-division multiplexed switch fabric. In some embodiments, the switch fabric can be included within a data center network (e.g., a core portion of a data center network). Specifically, the switch fabric can define a core portion of the data center network, which can include a network or interconnection of devices. In some embodiments, the switch fabric can be defined based on a Clos network architecture (e.g., a strict sense non-blocking Clos network, a Benes network) that forms the data plane for a distributed switch/router system that can be included in (or can define) the core of a data center network. In some embodiments, one or more peripheral processing devices (e.g., a compute node, a storage node, a service node and/or a router) and/or other network devices, which can be operatively coupled to (e.g., included within) the data center network. More details related to a switch fabric are set forth in co-pending U.S. patent application Ser. No. 12/414,825, filed Mar. 31, 2009, entitled, "Distributed Multi-Stage Switch Fabric," co-pending U.S. patent application Ser. No. 12/345,502, filed Dec. 29, 2008, entitled, "Methods and Apparatus Related to a Modular Switch Architecture," and co-pending U.S. patent application Ser. No. 12/345,500, filed Dec. 29, 2008, entitled, "System Architecture for a Scalable and Distributed Multi-Stage Switch Fabric," all of which are incorporated herein by reference in their entireties.

In some embodiments, one or more portions of the flow module 100 can include a hardware-based module (e.g., a digital signal processor (DSP), a field programmable gate array (FPGA)) and/or a software-based module (e.g., a module of computer code, a set of processor-readable instructions that can be executed at a processor). In some embodiments, one or more of the functions associated with, for example, the first logic module 110 and/or the second logic module 120 can be performed by different modules and/or combined into one or more modules. In some embodiments, the flow module 100 can be included in one or more physical units such as a rack unit or chassis.

In some embodiments, processing of the flow module 100 can be based on data units such as cells (e.g., fixed-size cells, variable-sized cells) in lieu of, or in addition to, packets. For example, the flow module 100 can be configured to process packets parsed (and/or combined) into cells that can be transmitted within, for example, a switch fabric of a data center. In some embodiments, the flow module 100 can be configured to parse (and/or combine) one or more packets into one or more cells before processing and/or sending the cell(s) to another device (not shown). In some embodiments, the flow module 100 can also be configured to reconstruct the packet(s) from the cell(s).

Figure 2A:
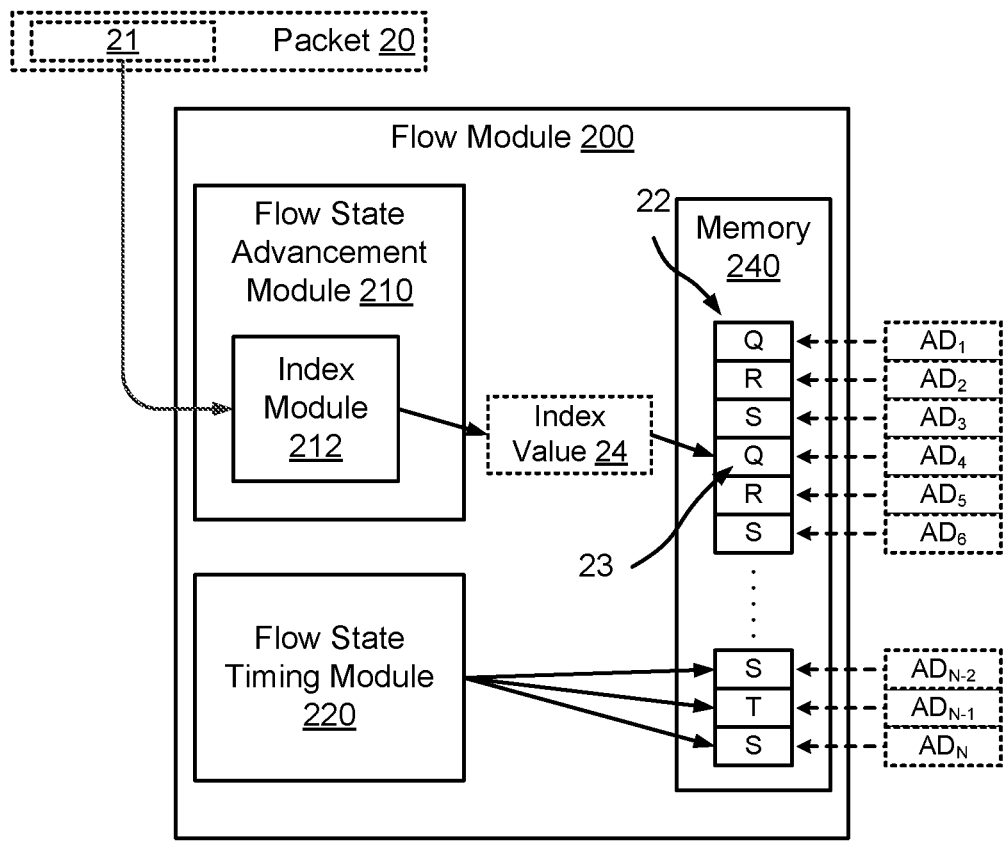
FIG. 2A is a schematic diagram that illustrates a flow module including a flow state advancement module and a flow state timing module that are configured to modify flow state values stored in a memory, according to an embodiment.

FIG. 2A is a schematic diagram that illustrates a flow module 200 including a flow state advancement module 210 and a flow state timing module 220 that are configured to modify flow state values 22 stored in a memory 240, according to an embodiment. As shown in FIG. 2A, each of the flow state values 22 are stored in memory locations represented by address values $AD_1$ through $AD_N$. For example, a flow state value of Q is stored in the memory 240 at a memory location represented by the address location $AD_1$, and a flow state value of R is stored in the memory 240 at a memory location represented by the address location $AD_2$. In some embodiments, the flow state advancement module 210 and the flow state timing module 220 can, respectively, correspond with, for example, the first logic module 110 and the second logic module 120 shown in FIG. 1. In some embodiments, each of the memory locations within the memory 240 can be associated with a single data flow (or single data flow type). For example, when one or more packets defining a data flow are received at the flow module 200, the flow module 200 can be configured to select a memory location based on a hash of a portion of, for example, a header (e.g., an L2 portion, an L3 portion, an L4 portion) or another portion of the packet(s). Accordingly, the data flow can be associated with the memory location.

The flow state advancement module 210 is configured to increment (e.g., increment at a single memory location) one or more of the flow state values 22 stored in the memory 240 when the flow state value(s) 22 are selected by the flow state advancement module 210 based on processing of packets received at the flow module 200. For example, one of the flow state values 22 at a memory location from the memory 240 can be replaced (e.g., overwritten) at that memory location with an incremented flow state value in response to that memory location being selected (or an indicator of that memory location) by the flow state advancement module 210 based on processing of a packet.

The flow state timing module 220 is configured to decrement (e.g., decrement at a single memory location) one or more flow state values 22 when the flow state value(s) 22 are selected by the flow state timing module 220 based on sequential processing through the flow state values 22 stored at given memory locations within the memory 240. For example, a first flow state value (from the flow state values 22) at a first memory location from the memory 240 can be selected based on sequential processing through the memory locations of the memory 240. The first flow state value can be replaced at the first memory location with a decremented flow state value. A second flow state value (from the flow state values 22) can be replaced at a second memory location (different from the first memory location) with another decremented flow state value after being selected based on the sequential processing through the memory locations of the memory 240.

Because selection of flow state value(s) 22 is performed by (e.g., executed by) the flow state advancement module 210 in a manner that is different than a manner in which selection is performed by the flow state timing module 220, the flow state advancement module 210 is configured to increment the flow state value(s) 22 stored in the memory 240 independent of the decrementing performed by the flow state timing module 220. In this embodiment, the flow state advancement module 210 is configured to increment the flow state values 22 (if selected) based on a series of flow state values 36 shown in FIG. 2B, and the flow state timing module 220 is configured to decrement the flow state values 22 (if selected) based on the series of flow state values 36 shown in FIG. 2B. In some embodiments, when a flow state value from the flow state values 22 are incremented or decremented, the flow state value can be replaced with a different flow state value.

The flow state timing module 220 is configured to perform the decrementing of the flow state values 22 at a rate that offsets the incrementing of the flow state values 36 performed by the flow state advancement module 210 unless a data flow includes a cluster of packets associated with a successful connection. In such instances, the rate of incrementing performed by the flow state advancement module 210 (which will be triggered at a relatively rapid rate by the cluster of packets) will exceed the rate of decrementing performed by the flow state timing module 220 so that the flow state advancement module 210 changes one or more of the flow state values 22 based on the series of flow state values (shown in FIG. 2B) towards a threshold flow state value that represents that the data flow is associated with a successful connection.

In some embodiments, the series of flow state values 36 can be defined by a series of bit values (e.g., "00"←→"01"←→"10"←→"11"). In some embodiments, a number of flow state values can be determined based on the bit-wise width of the flow state values. For example, 16 flow state values can be represented by a 4-bit flow state values.

As shown in the example of FIG. 2A, the flow state advancement module 210 is configured to increment the flow state value 23 (which is a flow state value of Q) stored at the memory location represented by address value $AD_4$. The memory location represented by address value $AD_4$ is selected by the flow state advancement module 210 based on processing of a portion 21 of packet 20. Specifically, the flow state advancement module 210 has an index module 212 configured to define an index value 24 based on the portion 21 (e.g., a header portion, a trailer portion) of the packet 20. As shown in FIG. 2, the index value 24 is used to identify the memory location within the memory 240 that is represented by address value $AD_4$. Accordingly, the flow state advancement module 210 is configured to increment the flow state value of Q (shown at 23) in response to the memory location represented by the address value $AD_4$ being identified based on the index value 24.

In some embodiments, the index value 24 can correspond with the address value $AD_4$. In some embodiments, the index value 24 can be, for example, a hash value calculated based on the portion 21 of the packet 20. In such embodiments, the index module 212 can be a hash module (e.g., a hash module configured to implement a hash function) configured to define index value 24 (and/or other index values (not shown)), and the flow state values 22 can be stored as a hash table in the memory 240. Although not shown, the index module 212 can be configured to define another index value (e.g., an index value different than index value 24) based on a different portion of the 20 packet or a portion of a different packet (not shown). In some embodiments, the flow state values 22 stored in the memory 240 can collectively define a flow table. In some embodiments, the flow table can be implemented as a bloom filter (and using multiple hash functions). In some embodiments, the functionality of the index module 212 can be defined so that collisions related to index value calculations can be reduced to a desirable level.

In some embodiments, the indexing performed by the index module 212 of the flow module 200 can be performed so that one or more of the memory locations from the memory 240 (which are actively being used to store a flow state value) can be associated with a particular packet signature (e.g., a particular L2/L3/L4 bit pattern). Accordingly, a memory location (e.g., the memory location represented by address $AD_3$) from the memory 240 can be uniquely associated with (e.g., substantially uniquely associated with) a particular data flow. Thus, a flow state value 22, which is associated with a particular data flow, can be incremented and/or decremented at a single memory location (e.g., a single memory location from the memory 240) that is also associated with the particular data flow.

In some embodiments, the portion 21 of the packet 20 can be, for example, at least a portion of a header of the packet 20, at least a portion of a payload of the packet 20, and/or at least a portion of a trailer of the packet 20. In some embodiments, the portion 21 of the packet 20 can be associated with (e.g., can define) a signature of the packet 20. In some embodiments, the packet 20 can be associated with a data flow. In some embodiments, the portion 21 of the packet 20 can be used to associate the packet 20 with a data flow (not shown in FIG. 2A). In such instances, the packet 20 can define a portion of the data flow.

In some embodiments, memory locations from the memory 240 can be selected for flow state value incrementing by the flow state advancement module 210 based on processing of packets (from one or more data flows) as they are received at the flow module 200. Accordingly, the timing for incrementing can be related to (e.g., proportional to, corresponding to) the flow rate of the packets received at the flow module 200. For example, the flow state value of R at the memory location represented by the address value $AD_2$ can be incremented at that memory location represented by the address value $AD_2$ immediately after an index value corresponding to the address value $AD_2$ is defined by the index module 212 based on a first packet received at a first time. The flow state value of S at the memory location represented by the address value $AD_3$ can be incremented at that memory location represented by the address value $AD_3$ immediately after an index value corresponding to the address value $AD_3$ is defined by the index module 212 based on a second packet received at a second time after the first time. A time period between the incrementing of the flow state value R and the incrementing of the flow state value S can substantially correspond with a time period between the first time (which is associated with the receipt time of the first packet) and the second time (which is associated with the receipt time of the second packet).

In some embodiments, the flow state advancement module 210 can be configured to delay incrementing of one or more of the flow state values 22 stored in the memory 240 after a memory location associated with the one or more flow state value(s) 22 has been selected (using the index module 212). For example, the flow state advancement module 210 can be configured to delay (for a specified period of time) incrementing of flow state values associated with a specified memory location (selected using the index module 212) such as the memory location represented by memory location $AD_5$. In some embodiments, the flow state advancement module 210 can be configured to delay (for a specified period of time) incrementing of a flow state value based on a signature of a packet.

Figure 2B:
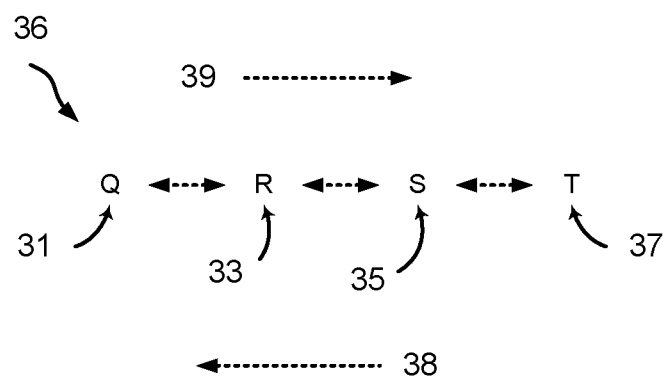
FIG. 2B is a schematic diagram that illustrates a series of flow state values, according to an embodiment.

The flow state advancement module 210 shown in FIG. 2A is configured to increment the flow state value 23 based on the series of flow state values 36 shown in FIG. 2B. As shown in FIG. 2B, the series of flow state values 36 includes four flow state values. Specifically, the flow state values 36 includes flow state value Q (which is shown at 31), flow state value R (which is shown at 33), flow state value S (which is shown at 35), and flow state value T (which is shown at 37).

As shown in FIG. 2B, the flow state values 36 are arranged in an order. Specifically, flow state value S (shown at 35) is disposed between flow state value R (shown at 33) and flow state value T (shown at 37). Flow state value R (shown at 33) is disposed between flow state value Q (shown at 31) and flow state value S (shown at 35). In some embodiments, the flow state value Q (shown at 31), which is the leftmost flow state value in the decrement direction 38, can be referred to as an initial flow state value. In some embodiments, the flow state value T (shown at 37), which is the rightmost flow state value in the increment direction 39, can be referred to as a final flow state value. In some embodiments, a change of a flow state value can be referred to as a transition or as a flow state value transition. In some embodiments, a flow state value can be referred to as transitioning from a first flow state value (e.g., flow state value R) to a second flow state value (e.g., flow state value S). In some embodiments, the flow state values (i.e., flow state values R and S) between the initial flow state value and the final flow state value can be referred to as intermediate flow state values.

The increment direction is shown as direction 39 and the decrement direction is shown as direction 38. Accordingly, a flow state value is incremented when changed from the flow state value of R (shown at 33) to the flow state value S (shown at 35). Similarly, a flow state value can be decremented when changed from the flow state value of T (shown at 37) to the flow state value S (shown at 35). Accordingly, when the flow state value of Q (shown at 23 in FIG. 2A) is incremented by the flow state advancement module 210 (shown in FIG. 2A), the flow state advancement module 210 changes the flow state value of Q based on the series of flow state values 36 (shown in FIG. 2B) in the increment direction 39 to the flow state value of R. When the flow state value of T at the memory location represented by address value $AD_{N-1}$ (shown in FIG. 2A) is decremented by the flow state timing module 220 (shown in FIG. 2A), the flow state timing module 220 changes the flow state value of T based on the series of flow state values 36 (shown in FIG. 2B) in the decrement direction 38 to the flow state value of S. In some alternative embodiments, the increment direction 39 can be opposite that shown, and the decrement direction 38 can be opposite that shown.

In some embodiments, the flow state values 36 can each represent a precise (or approximate) number of packets associated with a particular data flow. For example, the flow state value of Q (shown at 31), which is the initial flow state value, can represent that no packets have been received. The flow state value of R (shown at 33) can represent that a first packet associated with a data flow has been received. The flow state value of S (shown at 33) can represent that a second packet associated with the data flow has been received. The flow state value of T (shown at 37) can represent that more than two packets associated with the data flow has been received.

Flow state values 36 representing relatively high numbers of packets of a data flow can indicate that the data flow is associated with a successful connection (e.g., a session) (because many packets will be transmitted to a flow module when a successful connection has been established). In contrast, flow state values 36 (such as flow state values R and S) representing relatively low numbers of packets of a data flow can represent that the data flow is associated with an unsuccessful or denied connection (e.g., session) attempt (because very few packets will be transmitted to a flow module when packets associated with a data flow have been denied access and a connection has not been established). Because the flow state value of T represents that more than two packets associated with data flow have been received at a flow module, the flow state value of T can represent that the packets defining the data flow are associated with an authorized connection/session through which packets are being exchanged.

Referring back to FIG. 2A, the flow state timing module 220 is configured to decrement one or more of the flow state values 22 stored in the memory 240 independent of the incrementing performed by the flow state advancement module 210. The flow state timing module 220 is configured to decrement the flow state values 22 stored in the memory 240 based on sequential processing (also can be referred to as serial processing) through the memory locations where the flow state values 22 are stored in the memory 240 and based on the series of flow state values 36 shown in FIG. 2B. For example, the flow state timing module 220 is configured to decrement the flow state value of S at the memory location represented by the address value $AD_{N-2}$ at a first time (or a during a first time period) and is configured to decrement the flow state value of T at the memory location represented by the address value $AD_{N-1}$ at a second time (or a during a second time period) after the first time. After the flow state value of T stored at the memory location represented by the address value $AD_{N-1}$ is decremented, the flow state timing module 220 can be configured to decrement the flow state value of S at the memory location represented by the address value $AD_{N-1}$ at a third time (or during a third time period) after the second time.

A time period during which the flow state timing module 220 completes processing (e.g., decrement related processing) through the memory locations of the memory 240 (e.g., through memory locations represented by $AD_1$ through $AD_N$) at least one time can be referred to as a processing cycle time period. In some embodiments, a processing cycle time period can be defined so that flow state values are decremented at a certain rate. For example, the flow state timing module 220 can be configured so that the processing cycle time period is a specified duration. Accordingly, each flow state value from the flow state values 22 will be processed by the flow state timing module 220 at a rate based on the specified duration.

In some embodiments, the flow state timing module 220 can be configured to decrement the flow state values 22 so that flow state values 22 associated with unsuccessful connection attempts and flow state values 22 associated with successful connections can be tracked. For example, the flow state timing module 220 can be configured to decrement the flow state values 22 so that sparsely-received packets defining a data flow associated with unauthorized connection attempts will be characterized by flow state values 22 representing low numbers of packets (e.g., flow state values of R and S). The flow state timing module 220 can also be configured to decrement the flow state values 22 so that relatively high rates of packets defining a data flow associated with an established connection will be characterized by flow state values 22 representing high numbers of packets (e.g., the flow state value of T). Specifically, the flow state timing module 220 can be configured to decrement flow state values 22 of relatively short-lived data flows (e.g., flow state values R and S) to the initial flow state value of Q after the data flows being accounted for as unsuccessful connection attempts. The flow state timing module 220 can be configured to decrement flow state values 22 of established data flows (associated with a successful connection)

represented by a flow state value of T at a relatively slow rate. Accordingly, the flow state values 22 associated with established data flows will persist in the memory 240 for a relatively long period of time.

Even if one of the flow state values 22 associated with a data flow of an established connection is decremented by the flow state timing module 220, the flow state value 22 may only be momentarily decremented. For example, if the flow state value of T shown at memory location $AD_{N-1}$ (which can be associated with an established connection) is decremented by the flow state timing module 220 to the flow state value of S, the relatively high rate of packets of the data flow of the established connection associated with the memory location $AD_{N-1}$ would trigger the flow state advancement module 210 to increment the flow state value back to the flow state value of T. In such instances, the momentary decrementing of the flow state value at memory location $AD_{N-1}$ may not be long enough to cause the data flow associated with the memory location $AD_{N-1}$ to be identified as being a data flow associated with an unsuccessful connection attempt.

In some embodiments, the flow state values 22 can be collectively used to track a number of unsuccessful connection attempts and/or a number of successful connections. In some embodiments, the flow state values 22 can be used track these numbers during a specified period of time. In some embodiments, the flow state values 22 can be used to determine a rate of successful connections and/or unsuccessful connection attempts. In some embodiments, various statistics related to numbers of successful connections and/or unsuccessful connection attempts can be calculated at, for example, the flow module 200.

For example, at the instant in time shown in FIG. 2A, the flow state values of R and S, which can represent short-lived unsuccessful flows, can be counted as unsuccessful connection attempts. Specifically, the data flows associated with the six of the memory locations including flow state values of R and S would be counted as unsuccessful connection attempts. Only the data flow associated with memory location $AD_{N-1}$ would be counted as a successful connection. In some embodiments, the ratio of unsuccessful connection attempts to successful connection attempts can be tracked based on the flow state values 22 (during a specified period of time). In some embodiments, the flow module 200 can be configured to send out a notification when one or more threshold conditions related to tracking of flow state values 22 is satisfied.

In some embodiments, at least one packet associated with each new data flow (identified based on a transition from the flow state value of Q (i.e., the initial flow state value) to the flow state value of R) can be sent to a flow analysis module such as that shown in FIG. 1. In some embodiments, at least a portion of the first packet (e.g., the first packet received in time) associated with each new data flows can be sent to the flow analysis module for further processing. In some embodiments, at least a portion of a packet associated with a particular flow state transition (e.g., a transition to an intermediate flow state) can be sent to the flow analysis module for further processing (e.g., further processing to determine whether or not one or more portions of the data flow is associated with a flow anomaly). In some embodiments, at least a portion of a packet triggering a flow state transition within or exceeding a specified period of time (e.g., a period of time from a prior packet) can be sent to the flow analysis module. In some embodiments, the flow module 200 can be configured to send data packets based on the processing capabilities of the flow module 200 (and/or the processing capabilities of the flow analysis module). In some embodiments, for example, if a high volume of new data flows are being received at the flow module 200, the flow analysis module may be configured to analyze only a portion of the data packets associated with the new data flows. Data packets that are not analyzed at the flow analysis module may be dropped by the flow analysis and left unanalyzed. In some embodiments, the flow analysis module may be configured to analyze only a subset (e.g., a sample) of the data packets associated with new data flows. The packets analyzed at the flow analysis module can be used to determine whether or not one or more of the new data flows is associated with a flow anomaly.

In some embodiments, the flow state timing module 220 can be configured to decrement flow state values at less than all of the memory locations from the memory 240. For example, in some embodiments, the flow state timing module 220 can be configured to decrement only flow state values that are not the initial flow state value of Q (shown at 31 in FIG. 2B). Accordingly, in some embodiments, a processing cycle time period can be defined, at least in part, based on a percentage of memory locations from the memory 240 that are not the initial flow state value of Q. In some embodiments, a flag (or other identifier) can be set (and associated with the memory locations of the memory 240) so flow state values 22 included in memory locations associated with active data flows will processed, but memory locations that are not associated with active data flows will not be processed.

In some embodiments, the sequential processing through the memory locations of the memory 240 can be based on various time periods. For example, the flow state timing module 220 can be configured to decrement a flow state value at one or more of the memory locations after a specified time period (e.g., a 2 millisecond) has expired. The specified time period can be referred to as a wait time period or as a decrement wait time period. The specified time period can be determined based on, for example, a counter value or a specified number of clock cycles. Specifically, the flow state timing module 220 can be configured to decrement a flow state value at the memory location represented by address value $AD_{N-1}$ 5 microseconds after the flow state value at the memory location represented by address value $AD_{N-2}$ has been decremented.

In some embodiments, a wait time period can be based on a transition (e.g., a flow state value transition). For example, a wait time period before decrementing of the flow state value S (to flow state value R) at the memory location represented by address value $AD_N$ can be a time period specified based on the current flow state value stored at the memory location. Specifically, the specified time period can have a duration that depends on (e.g., is determined based on) the current flow state value stored at memory location $AD_N$ being a flow state value of S. In some embodiments, the wait time period can be determined by one or more timer modules (not shown) (also can be referred to as timing modules).

In some embodiments, the flow state timing module 220 can be configured to decrement the flow state values 22 based on the different transitions and/or different time periods. For example, the flow state timing module 220 can be configured to decrement the flow state values from T to S based on a time period T3, decrement the flow state values from S to R based on a time period T2, and the flow state values from R to Q based on a time period T1. In some embodiments, the time period T3 can be less than, greater than, or equal to the time period T2 and/or the time period T1. In some embodiments, the time period T2 can be less than, greater than, or equal to the time period T1. In some embodiments, if the flow state value T represents a data flow associated with an established connection (e.g., a successful connection), the time period T3 associated with the transition from T to another flow state can be greater than the time periods T2 and T1, which are associated with transitions from flow state values that represent (or potentially represent) unsuccessful connection attempts. The time periods can be defined in this fashion so that flow state values associated with successful connections will be relatively slowly transitioned to a flow state value representing an unsuccessful connection attempt (or the initial flow state value). The time period T3 can be defined so that the transition from the flow state value of T, representing a successful connection, will be decremented (to flow state values representing unsuccessful connection attempts and/or the initial flow state value) after the successful connection has been terminated for at least a specified period of time. In some embodiments, the time periods can be determined based one or more timer modules (associated with the flow state timing module 220).

Said differently, in some embodiments, a first flow state value type can be decremented based on a first wait time period and/or a first processing cycle time period, and a second flow state value type can be decremented based on a second wait time period and/or a second processing cycle time period. The processing cycles time periods and/or the wait time periods can be different. For example, each of the flow state values stored in the memory 240 and having a flow state value of S can be decremented by a first timing module. Each of the flow state values stored in the memory 240 and having a flow state value of R can be decremented by a second timing module (different from the first timing module). Similarly, each of the flow state values stored in the memory 240 and having a flow state value of T can be decremented by a third timing module (different from the first timing module). Accordingly, after a flow state value of R (at a specified memory location from the memory 240) is decremented to the flow state value of S based on the first timing module, the flow state value of S will be decremented (if not incremented) to the flow state value of Q by the second timing module.

In some embodiments, a wait time period associated with a memory location can be based on a transition of a different memory location. In some embodiments, for example, a wait time period before decrementing of the flow state value S (to flow state value R) at the memory location represented by address value $AD_N$ can be a time period specified based on the transition of the memory location represented by the address value $AD_{N-1}$, which is above the memory location represented by the address value $AD_N$. Specifically, the specified time period can have a duration that depends on the transition at the memory location represented by the address value $AD_{N-1}$ being from a flow state value of T to a flow state value of S. If the transition at the memory location represented by the address value $AD_{N-1}$ were from, for example, a flow state value of S to a flow state value of R, the duration could be different.

In some embodiments, one or more of the memory locations can be associated with a timer module (not shown) that can be used to determine when a flow state value associated with the memory location should be decremented. For example, the flow state value at memory location $AD_4$ can be decremented based on a wait time period that has a duration (as determined by a timer module) that is different than a duration of a wait time period (as determined by a timer module (not shown)) associated with memory location $AD_3$. In such instances, decrementing can be based on these wait time periods rather than based on a processing cycle time period.

In some embodiments, the flow state timing module 220 can be configured to randomly select and then decrement one or more of the flow state values 22 stored in the memory 240. For example, the flow state timing module 220 can be configured to select a memory location from the memory 240 (e.g., the memory location represented by $AD_6$) based on, for example, a random number generator. If the flow state value stored at the memory location is not the initial flow state value, the flow state value can be decremented.

In some embodiments, the flow module 200 can be configured to perform an action or trigger an action when a state condition is satisfied or unsatisfied. In some embodiments, the satisfying (or unsatisfying) of the state condition can be used to determine which packets (or data flows) should be further analyzed to determine whether or not they are related to, for example, a denial of service attack, or can be used to trigger sending of a notification that a packet is potentially related to a denial of service attack. In some embodiments, for example, the flow module 200 can be configured to, for example, analyze a portion of a packet (or send a signature of a packet to another device for analysis) when a flow state value associated with the packet does not change to a final flow state value (e.g., a flow state value of T), for example, within a specified period of time. In some embodiments, for example, the flow state value of S stored at the memory location represented by AD6 can be changed by the flow state advancement module 210 to the final flow state value of T in response to a portion of a packet being processed at the flow state advancement module 210. The packet need not be further analyzed at a flow analysis module (not shown) because the flow state value of S is changed to the threshold flow state value of T.

In some embodiments, the flow module 200 can be configured to perform an action or trigger an action based on one or more of the flow state values being changed to one or more of the flow state values from the series of flow state values 36 shown in FIG. 2B. For example, the flow module 200 can be configured to perform an action in response to one or more of the flow state values 22 being changed to flow state value S (shown at 35 of FIG. 2B), and can be configured to perform a different action in response to one or more of the flow state values 22 being changed to flow state value R (shown at 33 of FIG. 2B). In some embodiments, the action(s) performed by the flow module 200 can depend on whether the transition to the flow state value is based on the increment direction 39 or the decrement direction 38. For example, the flow module 200 can be configured to perform an action in response to a flow state value from the flow state values 22 being incremented to flow state value S by the flow state advancement module 210, and can be configured to perform a different action in response to the flow state value from the flow state values 22 being decremented to flow state value S by the flow state timing module 220.

In some embodiments, a conflict preference can be used to resolve conflicts between the flow state advancement module 210 and the flow state timing module 220. For example, if the flow state advancement module 210 and the flow state timing module 220 attempt to change a flow state value from the flow state values 22 at the same time (or during the same time period), the flow module 200 can be configured to resolve the conflict based on a conflict preference. In some embodiments, the conflict preference can be defined so that it triggers the flow module 200 to, for example, allow the change by the flow state advancement module 210 and cancel the change by the flow state timing module 220 (or vice versa). In some embodiments, the conflict preference can be defined so that it triggers the flow module 200 to, for example, schedule a change by the flow state advancement module 210 before a change by the flow state timing module 220 is scheduled (or vice versa).

In some embodiments, the flow state advancement module 210 and/or the flow state timing module 220 can be configured to change a flow state value based on different sets of flow state values (e.g., a set of flow state values represented by strings of binary bit values). Accordingly, the flow state advancement module 210 and/or the flow state timing module 220 can be configured to change a flow state value based on a set of flow state values different than the series of flow state values 36 shown in FIG. 2B. For example, the flow state advancement module 210 can be configured to increment flow state values based on a first series of flow state values (not shown), and the flow state timing module 220 can be configured to decrement flow state values based on a second series of flow state values (not shown) different from or mutually exclusive from the first series of flow state values. At least some of the flow state values from the first series of flow state values can be included in the second series of flow state values. In some embodiments, the first series of flow state values and/or the second series of flow state values can be defined by an algorithm. The algorithm can be executed by the flow state advancement module 210 and/or the flow state timing module 220 when changing a flow state value.

In some embodiments, for example, the flow state advancement module 210 can be configured to increment one or more from flow state values 22 stored in the memory 240 based on the series of flow state values 36 (shown in FIG. 2B), and the flow state timing module 220 can be configured to reset selected flow state values 22 to the initial flow state value. Specifically, the flow state timing module 220 can be configured to change the flow state value of T at the memory location $AD_{N-1}$ to the flow state value of Q rather than decrementing the flow state value of T to the flow state value of S (which is next in the series of flow state values 36 in the decrement direction 38).

In some embodiments, the flow state advancement module 210 and/or the flow state timing module 220 can be configured to change (e.g., increment, decrement) one or more of the flow state values 22 stored at the memory locations of the memory 240 based on, for example, one or more conditions being satisfied or unsatisfied. For example, a memory location from the memory locations 240 can be selected based on a first set of conditions (can be referred to as a selection condition(s)), and a flow state value stored in the memory location can be changed based on a second set of conditions (can be referred to as a change condition(s)). In some embodiments, the condition(s) (e.g., selection condition(s), change condition(s)) can be implemented based on an algorithm and/or based on a user preferences.

For example, the flow state advancement module 210 and/or the flow state timing module 220 can be configured to change the flow state value of Q (shown at 23) based on a time period during which the packet 20 is received. For example, the flow state value of Q (shown at 23) can be changed to a particular flow state value based on the packet 20 being received at a particular time of day. In some embodiments, for example, the flow state advancement module 210 and/or the flow state timing module 220 can be configured to change the flow state value of Q (shown at 23) based on an equation and/or a combination of bit values defining the portion 21 of the packet 20. In some embodiments, the flow state advancement module 210 and/or the flow state timing module 220 can be configured to change the flow state value of Q (shown at 23) based on the packet 20 being a particular type of packet. In some embodiments, the flow state advancement module 210 and/or the flow state timing module 220 can be configured to change the flow state value of Q (shown at 23) based on an order of the packet 20 within a data flow. In some embodiments, order of the packet 20 within the data flow can be determined based on the portion 21 (e.g., a sequence value included in the portion 21) of the packet 20.

In some embodiments, the memory locations within the memory 240 can be initialized to a specified flow state value. For example, the initial flow state value of Q (shown in FIG. 2B) can be stored at each of the memory locations within the memory 240 when operation of the flow module 200 is commenced. In other words, the memory locations of the memory 240 can be initialized to the initial flow state value of Q before analysis of data flows is performed by the flow module 200. In some embodiments, one or more of the memory locations within the memory 240 can be set to a specified flow state value any time during operation of the flow module 200. For example, the memory locations within the memory 240 can be randomly, periodically, and/or so forth set to one or more specified flow state values (e.g., one or more flow state values from the series of flow state values 36 shown in FIG. 2B) during operation of the flow module 200. In some embodiments, a memory location (e.g., the memory location represented by address value AD4) of the memory 240 can be set to the initial flow state value of Q when the memory location is, for example, selected for the first time by the index module 212.

In some embodiments, the memory 240 can be implemented as multiple banks of on-chip or off-chip memory. For example, the memory 240 can be implemented as four memory banks 240a, 240b, 240c and 240d (not shown). The banks of the memory 240 can be configured to collectively store a single flow table or multiple separate flow tables. In some embodiments, two or more of the memory banks 240a, 240b, 240c and 240d may be the same size, or different sizes. In some embodiments, one or more instances of the flow state timing module 220 can be used to decrement flow entries in one or more banks of the memory 240, and one or more instances of the flow state advancement module 210 can be used to decrement flow entries in one or more banks of the memory 240. Accordingly, a first flow state advancement module can be configured to increment flow state values associated with a first portion of a flow table, and a second flow state advancement module can be configured increment flow state values associated with a second portion of the flow table that is mutually exclusive from the first portion of the flow table. In some embodiments, the first flow state advancement module, and the second flow statement advancement module can be configured to operate during concurrent/parallel (or different/serial) time periods. Similarly, a first flow state timing module can be configured to decrement flow state values associated with a first portion of a flow table, and a second flow state timing module can be configured decrement flow state values associated with a second portion of the flow table that is mutually exclusive from the first portion of the flow table. In some embodiments, the first flow state timing module, and the second flow state timing module can be configured to operate during concurrent/parallel (or different/serial) time periods. Dividing the flow table (which can include tens of millions of flow entries (or potential flow entries)) in this fashion into different memory banks can be desirable if the flow table is relatively large and/or may be unmanageable (e.g., unmanageable from a timing perspective) for a single flow state advancement module and/or a single flow state timing module (as shown in FIG. 2A).

In some embodiments, a single flow state advancement module (such as flow state advancement module 210) can be specifically assigned to (e.g., dedicated to) and configured to increment the state of flow entries in more than one of the four banks of the memory 240. Similarly, a separate flow state timing module (such as flow state timing module 220) can be assigned to (e.g., dedicated to) and configured to decrement the state of flow entries in more than one of the four banks of the memory 240. More details related to multiple memory banks, flow state timing modules, and flow state advancement modules are described in connection with FIG. 7.

Figure 3:
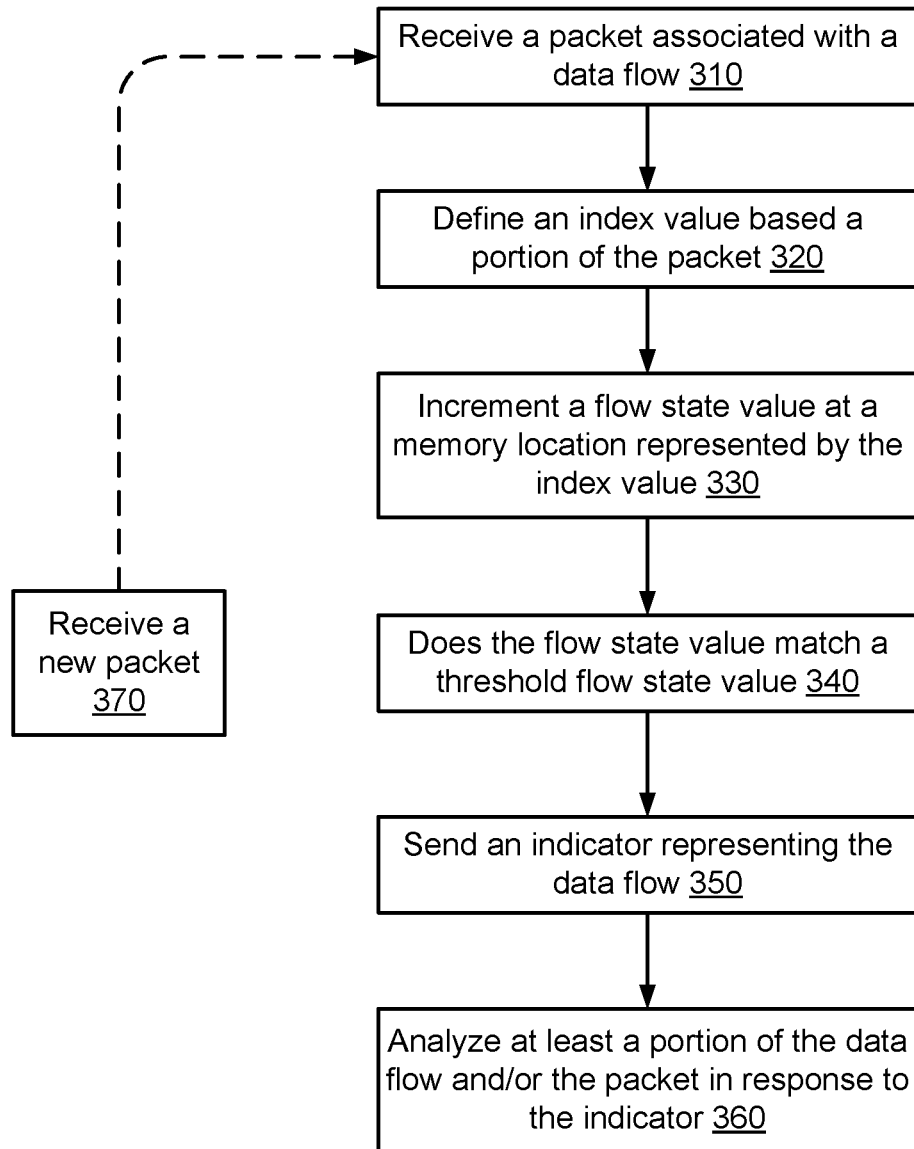
FIG. 3 is a flowchart that illustrates a method for changing a flow state value based on a packet, according to an embodiment.

FIG. 3 is a flowchart that illustrates a method for changing a flow state value based on a packet, according to an embodiment. As shown in FIG. 3, a packet associated with a data flow is received, at 310. In some embodiments, the packet can be a first packet within the data flow. In some embodiments, the packet can be received at a flow module from, for example, via a network. In some embodiments, the flow module can be included in a data center.

An index value is defined based a portion of the packet, at 320. In some embodiments, the index value can be defined based on, for example, a header portion of the packet. In some embodiments, the portion of the packet can represent a signature of the packet and/or can represent a signature of the data flow. In some embodiments, the index value can represent a signature of the packet. In some embodiments, the index value can be defined by bit values.

A flow state value is incremented at a memory location represented by the index value, at 330. In some embodiments, the flow state value can be incremented in accordance with a series of flow state values. In some embodiments, the flow state value can be incremented based on an algorithm. In some embodiments, the flow state value can be incremented based on a value (e.g., a flow state value) included at (e.g., stored at) the memory location before the flow state value is incremented at 330.

In some embodiments, the flow state value can be incremented from a default flow state value. In some embodiments, the flow state value can be incremented by, for example, a flow module. In some embodiments, the flow state value, before being incremented at 330, can be defined by a flow module in response to receipt of another packet associated with the data flow prior to the packet being received at 310.

In some embodiments, the memory location can be included in (e.g., can be within, can be at, can be a portion of) a memory of a flow module. In some embodiments, the index value can correspond with an address value of the memory location. In some embodiments, the index value can be defined by, for example, a hash module configured to implement a hash function. In such instances the index value can be a hash value. In some embodiments, the index value can be used to look-up the memory location.

If the flow state value matches (e.g., is equal to) a threshold flow state value, at 340, an indicator representing the data flow is sent, at 350. In some embodiments, the indicator can be sent to, for example, a network administrator and/or a flow analysis module. In some embodiments, the indicator can be a signature of the packet and/or the data flow. In some embodiments, indicator can be a portion of the packet. In some embodiments, the threshold flow state value can be defined so that the indicator is sent when the data flow is potentially related to an undesirable network anomaly. Alternatively, in some embodiments, indicator can be sent when the flow state value exceeds the threshold flow state value, is less than the threshold flow state value, is equal to an intermediate flow state value, and/or is not equal to the final flow state value. In some embodiments, the threshold flow state value can correspond with a final flow state value in a series of flow state values.

At least a portion of the data flow and/or the packet is analyzed in response to the indicator, at 360. Specifically, the indicator can be sent to a flow analysis module to trigger the flow analysis module to analyze the packet and/or the data flow. In some embodiments, the analysis can be performed to determine (e.g., determine more definitively, determine with a specified level of likelihood) whether or not the packet and/or the data flow is related to an undesirable network anomaly. Although not shown, a notification can be sent to, for example, a network administrator if one or more packets and/or one or more data flows are related to an undesirable network anomaly.

As shown in FIG. 3, a new packet can be received, at 370. In some embodiments, the new packet can be associated with the data flow described in connection with blocks 310 through 360, or a different data flow (not shown in FIG. 3). The new packet can be processed based on the logic associated with blocks 310 through 360. In some embodiments, at least a portion of the logic associated with the blocks shown in FIG. 3 can be executed for each packet received at, for example, a flow module so that flow state values can be incremented for each of the packets received at the flow module and so that further analysis of packets can be triggered when the flow state values match the threshold flow state value.

Figure 4:
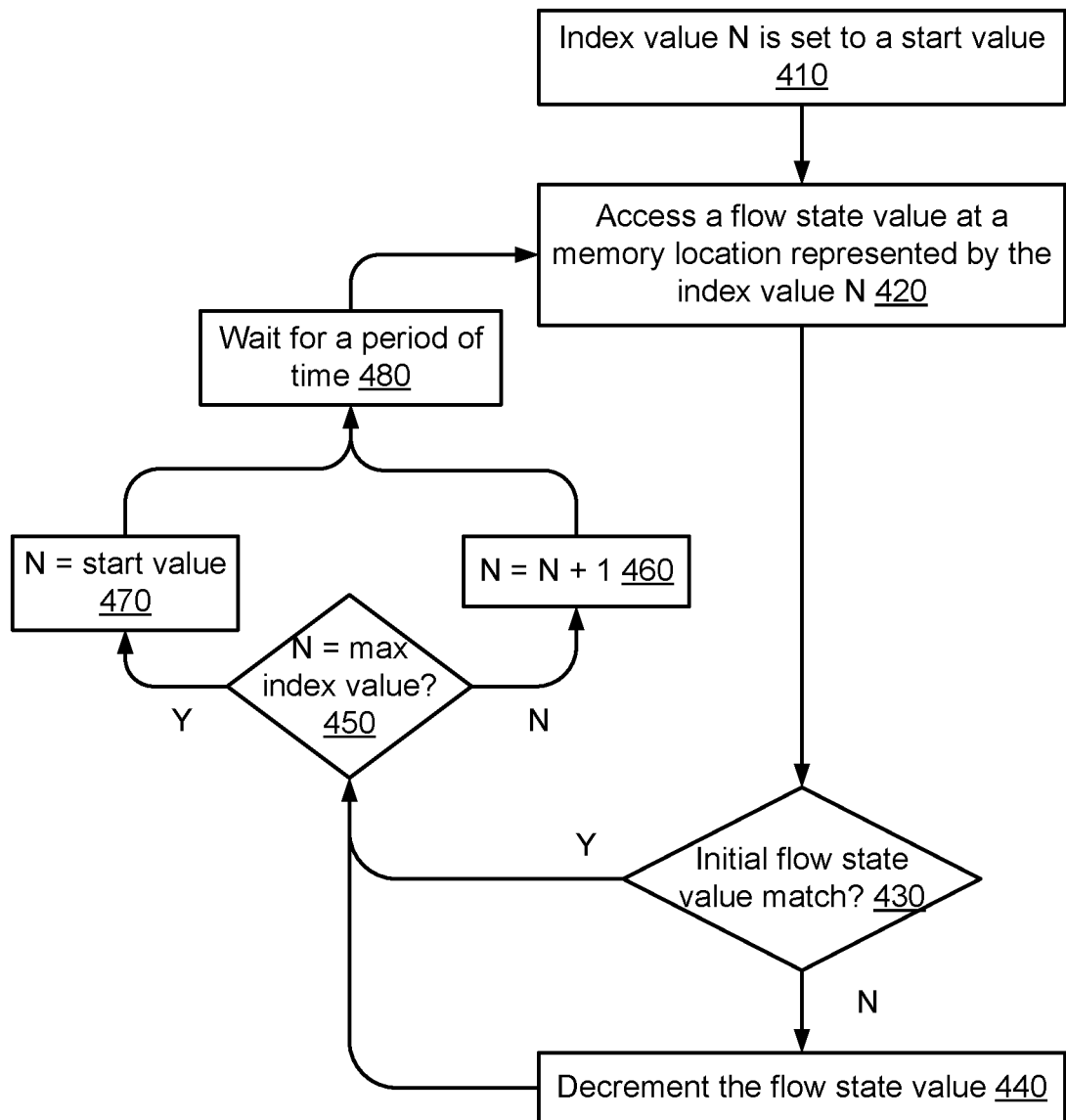
FIG. 4 is a flowchart that illustrates a method for changing a flow state value based on sequential processing through memory locations of a memory, according to an embodiment.

FIG. 4 is a flowchart that illustrates a method for changing a flow state value based on sequential processing through memory locations of a memory, according to an embodiment. Specifically, the flowchart illustrates a method for decrementing flow state value stored in a memory if the flow state values stored in the memory are not equal to an initial flow state value.

As shown in FIG. 4, an index value N is set to a start value, at 410. In some embodiments, the start value can correspond with an address value of a memory location. A flow state value at a memory location of a memory represented by the index value N is accessed, at 420. In some embodiments, the index value can be set to a start value that represents any one of the memory locations of a memory of a flow module. In some embodiments, the start value can correspond with an address value representing a start memory location (e.g., a first physical memory location) of the memory.

If the flow state value does not match (e.g., is equal to) an initial flow state value (shown at block 430) the flow state value is decremented, at 440. The initial flow state value can be a default flow state value included in each of the memory locations of the memory before the method shown in FIG. 4 is executed. In some embodiments, the initial flow state value can be an initial flow state value included in a series of flow state values.

In some embodiments, the flow state value can be decremented in accordance with a series of flow state values. In some embodiments, the flow state value can be decremented based on an algorithm. In some embodiments, the flow state value can be decremented based on a value (e.g., a flow state value) included at (e.g., stored at) the memory location before the flow state value is decremented at 440.

As shown in FIG. 4, the flow state value is not decremented (shown at block 440) when the index value N matches (e.g., is equal to) the initial flow state value (shown at 430) because the flow state value may not be further decremented. Specifically, the flow state may correspond with an initial flow state value from a series of flow state values, and thus, may not be further decremented.

After the flow state value is decremented (shown at block 440), or if the flow state does not match the initial flow state value (shown at block 430), the index value is processed to determine whether the index value N matches (e.g., is equal to) a maximum index value (shown at block 450). In some embodiments, the maximum index value can correspond with an address value representing an end memory location (e.g., a last physical memory location) of the memory.

If the index value N does not match (e.g., is not equal to) the maximum index value, the index value N is incremented (shown at block 460). If the index value corresponds to an address value of the memory location, the index value can be incremented to, for example, an address value of a memory location adjacent to the memory location. The index value N can be incremented so that processing through the memory locations of the memory can continue. In some alternative embodiments, the index value can be changed to, for example, an address value of a memory location based on an algorithm.

If the index value N does not match (e.g., is not equal to) the maximum index value (shown at block 450), the index value N is set to the start value (shown at block 470). The index value N is set to the start value so that processing at through the memory locations can be restarted.

Whether the index value is incremented (shown at block 460) or the index value is set to the start value (shown at block 470), the processing through the method of FIG. 4 is held for a period of time (shown at block 480). In some embodiments, the period of time may be defined based on the index value. For example, the period of time may be a first duration if the index value corresponds with a first address value and the period of time may be a second duration (different from the first duration) if the index value corresponds with a second address value (different from the first address value). In some embodiments, the period of time may be a specified duration if the flow state value corresponds with a particular flow state value.

In some embodiments, the method described in connection with FIG. 3 and the method described in connection with FIG. 4 can be executed with respect to a single (e.g., a common) memory. Specifically, a logic module can be configured to increment flow state values stored at memory locations of a memory based on the method associated with FIG. 3, and the logic module can be configured to decrement flow state values stored at the memory locations of the same memory based on the method associated with FIG. 4. The decrementing can be performed at a rate that offsets the incrementing unless a packet is potentially associated with a network data flow anomaly (e.g., a denial of service attack, a network routing error). In some embodiments, the decrementing can be performed at a rate that offsets the incrementing unless a packet is associated with a data flow of a successful connection (e.g., an authorized connection). In some embodiments, the method associated with FIG. 3 and the method associated with FIG. 4 can be executed independently at a single module or at separate modules.

Figure 5:
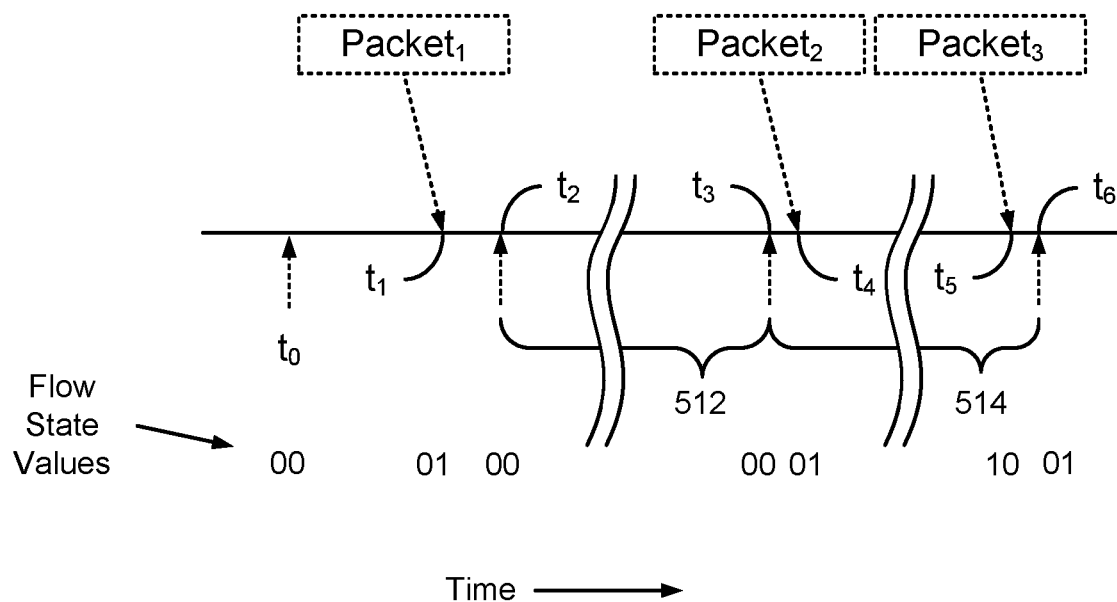
FIG. 5 is a schematic diagram that illustrates an incrementing and decrementing timeline, according to an embodiment.

FIG. 5 is a schematic diagram that illustrates an incrementing and decrementing timeline, according to an embodiment. As shown in FIG. 5, time increases to the right. As shown in FIG. 5, $packet_1$, $packet_2$, and $packet_3$ are received, respectively, at a flow module (not shown in FIG. 5) at time $t_1$, time $t_4$, and time $t_5$. In this embodiment, each of the packets are associated with a single data flow, and are associated with a single memory location of a memory (not shown in FIG. 5). A flow state value stored at the memory location can be incremented by, for example, a flow state advancement module (not shown in FIG. 5) when the packets are received at time $t_1$, time $t_4$, and time $t_5$.

At time $t_2$, time $t_3$, and time $t_6$ the flow state value stored at the memory location is decremented by, for example, a flow state timing module (not shown in FIG. 5) of the flow module. The time period 512 and the time period 514 are processing cycle time periods. In some embodiments, the time period 512 and the time period 514 can be substantially the same.

In some embodiments, a packet receipt rate can be derived from the timeline shown in FIG. 5. For example, as shown in FIG. 5 no packets are received within the time period 512, and two packets are received within the time period 514. As shown in FIG. 5, the packet receipt rate during time period 514 is 2 packets/time period, and the packet receipt rate during time period 512 is zero because no packets are received during the time period 512. In some embodiments, at least a portion of $packet_1$ can be sent to a flow analysis module in response to $packet_1$ being received.

As shown in FIG. 5 and assuming a flow state series of "00"←→"01"←→"10"←→"11," the flow state value associated with the data flow starts at an initial flow state value of "00." At time $t_1$, the flow state value is changed to an intermediate flow state value of "01" in response to receipt of $packet_1$. At time $t_2$, the flow state value is decremented to the initial flow state value of "00." At time $t_4$, the flow state value is incremented to the intermediate flow state value of "01" and then incremented to the intermediate flow state value of "10" at time $t_5$. Finally at time $t_6$, the flow state value is decremented to the intermediate flow state value of "01." In some embodiments, the data flow can be identified as potentially being associated with an unsuccessful connection attempt because the flow state value is not changed to the final flow state value of "11" (which can represent a successful connection) by the time the flow state value is decremented at time $t_2$ and/or decremented at time $t_6$.

Figure 6:
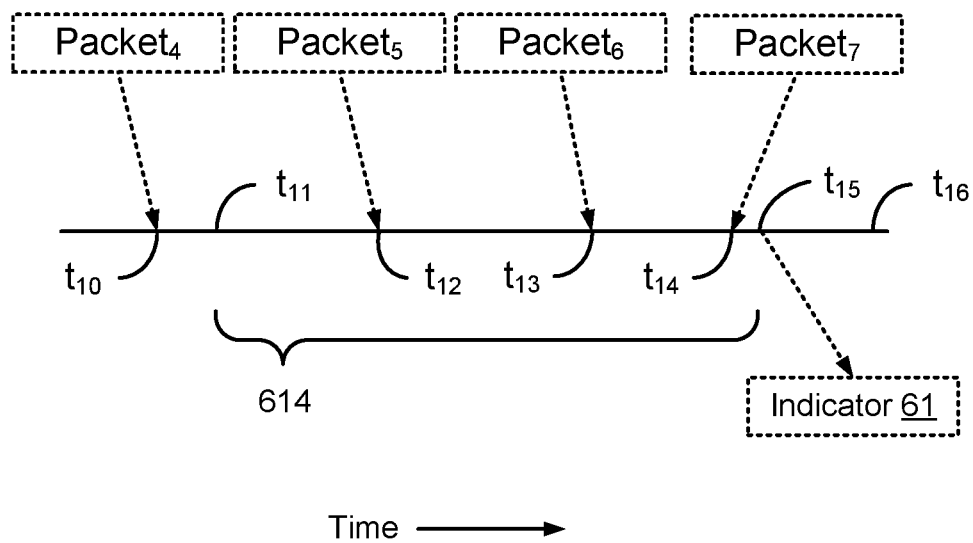
FIG. 6 is a schematic diagram that illustrates an incrementing and decrementing timeline, according to another embodiment.

FIG. 6 is a schematic diagram that illustrates an incrementing and decrementing timeline, according to another embodiment. As shown in FIG. 6, time increases to the right. As shown in FIG. 6, $packet_4$, $packet_5$, $packet_6$, and $packet_7$ are received, respectively, at a flow module (not shown in FIG. 6) at time $t_{10}$, time $t_{12}$, time $t_{13}$, and time $t_{14}$. In this embodiment, each of the packets are associated with a single data flow, and are associated with a single memory location of a memory (not shown in FIG. 6). A flow state value stored at the memory location is incremented by, for example, a flow state advancement module (not shown in FIG. 6) when the packets are received at time $t_{10}$, time $t_{12}$, time $t_{13}$, and time $t_{14}$. At each of time $t_{11}$ and time $t_{16}$ the flow state value stored at the memory location is decremented by, for example, a flow state timing module (not shown in FIG. 6) of the flow module.

In this embodiment, an indicator 61 that the data flow is associated with a successful connection is sent at time $t_{15}$ to a network administrator because the flow state value stored at the memory location after being incremented at time $t_{14}$ matches a final flow state value. As shown in FIG. 6, the flow state value stored at the memory location is incremented multiple times between time $t_{11}$ and time $t_{15}$ (without being decremented) until the flow state value is changed to the final flow state value. Specifically, the flow state value is incremented multiple times (without an intervening decrement) because $packet_5$, $packet_6$ and $packet_7$ are received as a burst of packets at the flow module shortly after the flow state value is decremented at time $t_{11}$ and before the flow state module can be decremented again at time $t_{16}$. The changing of the flow state value to the final flow state value represents that the burst of packets is received at high rate (e.g., a flow rate of packets that could be associated with a successful connection) between time $t_{11}$ and time $t_{15}$ (shown as time period 614).

Although not shown, in some embodiments, the flow state value may not be incremented between time $t_{15}$ and time $t_{16}$, even if another packet associated with the data flow were received at the flow module because the flow state value may have been changed at time $t_{14}$ to a final flow state value within a series of flow state values. In some embodiments, a log can be stored and used to prevent multiple indicators (e.g., multiple redundant indicators) of a successful connection (associated with a single data flow or group of data flows) from being sent to, for example, a network administrator when a flow state value (associated with the single data flow or group of data flows) is changed to a final flow state value multiple times within a specified time period.

Figure 7:
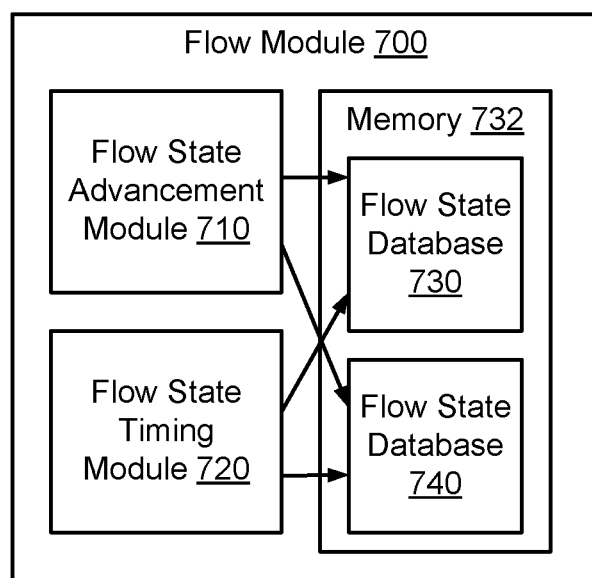
FIG. 7 is a schematic diagram that illustrates a flow module that includes a flow state advancement module and a flow state timing module that are collectively configured to process flow state values stored in multiple flow state databases of a memory, according to an embodiment.

FIG. 7 is a schematic diagram that illustrates a flow module 700 that includes a flow state advancement module 710 and a flow state timing module 720 that are collectively configured to process flow state values stored in multiple flow state databases of a memory 732, according to an embodiment. Specifically, the memory 732 is configured to store flow state database 730 and flow state database 740. In some embodiments, the flow state database 730 and the flow state database 740 can be stored in different memory banks (not shown). In some embodiments, each of the flow state databases can be configured to store flow state values associated with, for example, different network ports. For example, flow state database 730 can be configured to store flow state values associated with a first network port and flow state database 740 can be configured to store flow state values associated with a second network port. In some embodiments, the flow state database 730 and the flow state database 740 can be related to a single flow table.

In some embodiments, incrementing and decrementing of flow state values associated with each of the flow state databases can be performed at different rates. For example, incrementing of flow state values in the flow state database 730 can be performed at a rate different than a rate of incrementing of flow state values in the flow state database 740. Similarly, decrementing of flow state values in the flow state database 730 can be performed at a rate different than a rate of decrementing of flow state values in the flow state database 740.

In some embodiments, each of the flow state databases can be configured to store flow state values associated with certain types of data flows. For example, the flow state database 740 can be configured to store flow state values associated a signature (e.g., a packet signature) different than a signature (e.g., a packet signature) associated with flow state values stored in the flow state database 730. In some embodiments, the flow state database 730 and the flow state database 740 can be stored in separate memory banks or can be included in different allocated portions of the memory 732.

Although not shown, in some embodiments, the flow module 700 can have multiple flow state advancement modules and/or flow state timing modules. For example, multiple flow state advancement modules can be configured to increment flow state values stored in the flow state database 740 and a single flow state timing module can be configured to independently decrement the flow state values stored in the flow state database 740. In some embodiments, the flow module 700 can be configured to process data flows associated with one or more network devices (e.g., router devices, access switches).

Although not shown, in some embodiments, a first flow state advancement module can be dedicated to incrementing flow state values stored in the flow state database 740 (or a portion of the flow state database 740), and a second flow state advancement module can be dedicated to incrementing flow state values stored in the flow state database 730 (or a portion of the flow state database 730). In some embodiments, a first flow state timing module can be dedicated to decrementing flow state values stored in the flow state database 740 (or a portion of the flow state database 740), and a second flow state timing module can be dedicated to decrementing flow state values stored in the flow state database 730 (or a portion of the flow state database 730).

In some embodiments, each of the flow state databases can be configured to store flow state values associated with, for example, different data flows. In some embodiments, For example, flow state database 730 can be configured to store flow state values associated with a first data flow (or first set of data flows) and flow state database 740 can be configured to store flow state values associated with a second data flow (or second set of data flows). In such instances, flow state values associated with data flows may not be replaced (e.g., overwritten) and the flow state value history for each data flow can be stored in the flow state databases. For example, flow state values associated with a first data flow, rather than being replaced at a single memory location, can each be written to different memory locations within flow state database 730. Similarly, flow state values associated with a second data flow, rather than being replaced at a single memory location, can each be written to different memory locations within flow state database 740.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and read-only memory (ROM) and RAM devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, multiple flow modules can be configured to process in parallel a single data flow.

What is claimed is:

1. An apparatus, comprising:
a memory configured to store a first flow state value from a series of flow state values at a memory location; and
a processor configured to increment, after a delay that is based on a signature of a data packet, the first flow state value to a second flow state value from the series of flow state values (1) when the data packet is received, (2) when the memory location is identified based on an index value of the data packet, and (3) when the first flow state value is less than the second flow state value,
the processor configured to associate the memory location with a data flow in which the data packet is included based on a hash value calculated using at least a portion of the data packet,
the processor configured to conduct deep packet inspection on the data packet in response to the second flow state value matching a threshold flow state value when the first flow state value is changed to the second flow state value,
the processor configured to send, in response to the first flow state value changing to the second flow state value, a notice based on the second flow state value matching the threshold flow state value that indicates a network anomaly.

2. The apparatus of claim 1, wherein each of the first flow state value, the second flow state value, and a third flow state value is included in the series of flow state values.

3. The apparatus of claim 1, wherein the portion of the data packet is a first portion of the data packet, the processor configured to analyze a second portion of the data packet when the second flow state value matches the threshold flow state value.

4. The apparatus of claim 1, wherein each of the first flow state value and the second flow state value are included in an ordered series of flow state values, such that the second flow state value is ordered after the first flow state value.

5. The apparatus of claim 1, wherein each flow state value from the series of flow state values is used to track at least one of a number of unsuccessful network connection attempts and a number of successful network connection attempts.

6. A processor-readable non-transitory medium storing code representing instructions that when executed by a processor cause the processor to:
receive a data packet;
associate the data packet with a flow state value after receiving the data packet;
associate a data flow in which the data packet is included with a memory location based on a hash value calculated using at least a portion of the data packet;
increment, after a delay that is based on a signature of the data packet, the flow state value from a first flow state value to a second flow state value (1) in response to the data packet being associated with the flow state value, (2) when the memory location is identified based on an index value of the data packet, and (3) when the flow state value is less than the second flow state value;
conduct deep packet inspection on the portion of the data packet in response to the flow state value matching a threshold flow state value that indicates a network anomaly; and
send a notice indicating the network anomaly.

7. The processor-readable medium of claim 6, wherein each of the first flow state value and the second flow state value are included in a series of flow state values.

8. The processor-readable medium of claim 6, wherein each of the first flow state value and the second flow state value are included in an ordered series of flow state values, such that the second flow state value is ordered after the first flow state value.

9. The processor-readable medium of claim 6, wherein the flow state value is stored at the memory location selected using the hash value of the at least the portion of the data packet.

10. The processor-readable medium of claim 6, wherein the flow state value is a numerical count of a number of data packets that have been transmitted in connection with the data flow that includes the data packet.

11. The processor-readable medium of claim 7, wherein each flow state value from the series of flow state values is used to track at least one of a number of unsuccessful network connection attempts and a number of successful network connection attempts.

12. A processor-readable non-transitory medium storing code representing instructions that when executed by a processor cause the processor to:
update, at a memory location, a flow state value associated with a data flow when at least one of a packet from the data flow is received or the memory location is selected, the data flow being associated with the memory location based on a hash value calculated using at least a portion of the packet,
the update of the flow state value associated with the data flow is based on a progression through a series of flow state values including a first flow state value, a second flow state value, and a third flow state value, the flow state value associated with the data flow is incremented from the first flow state value to the second flow state value when (1) the packet is received, (2) the memory location of the first flow state value is identified based on an index value of the packet, and (3) the first flow state value is less than the second flow state value, the flow state value associated with the data flow being a numerical count of a number of data packets that have been transmitted in connection to the data flow, the incrementing of the flow state value associated with the data flow from the first flow state value to the second flow state value is delayed based on a signature of the packet;
conduct deep packet inspection on at least the portion of the packet in response to the flow state value associated with the data flow matching a threshold flow state value that indicates a network data flow anomaly; and
send a notice indicating the network data flow anomaly.

13. The processor-readable medium of claim 12, wherein the packet is received at a flow module of the processor, and the memory location is selected at the flow module, the update of the flow state value associated with the data flow is performed at the flow module.

14. The processor-readable medium of claim 12, wherein the data flow is identified as a new data flow in response to the flow state value associated with the data flow being updated.

15. The processor-readable medium of claim 12, wherein each flow state value from the series of flow state values is used to track at least one of a number of unsuccessful network connection attempts and a number of successful network connection attempts.

16. The processor-readable medium of claim 12, wherein the flow state value is stored at the memory location selected using the hash value of the at least the portion of the packet.

* * * * *